US006980450B2

(12) United States Patent
Bhate et al.

(10) Patent No.: US 6,980,450 B2
(45) Date of Patent: Dec. 27, 2005

(54) HIGH POWER DENSITY INVERTER AND COMPONENTS THEREOF

(75) Inventors: Suresh K. Bhate, Niskayuna, NY (US); John Cestra, Delanson, NY (US); Christopher B. Harrington, Nassau, NY (US); Leo Hoogenboom, Jonesville, NY (US)

(73) Assignee: Inverters Unlimited, Inc., Schenectady, NY (US)

( * ) Notice: Subject to any disclaimer, the term of this patent is extended or adjusted under 35 U.S.C. 154(b) by 796 days.

(21) Appl. No.: 09/882,188

(22) Filed: Jun. 15, 2001

(65) Prior Publication Data

US 2004/0208030 A1    Oct. 21, 2004

(51) Int. Cl.$^7$ ............................................. H02M 7/538
(52) U.S. Cl. ........................................ 363/134; 363/26
(58) Field of Search .............................. 363/24, 25, 26, 363/95, 97, 134, 141

(56) References Cited

U.S. PATENT DOCUMENTS

| | | | |
|---|---|---|---|
| 1,880,199 A | 10/1932 | Gebhard et al. | |
| 2,229,680 A | 1/1941 | Somes | 219/13 |
| 3,541,487 A | 11/1970 | Leonard | 336/58 |
| 3,643,131 A | 2/1972 | Scherbaum | 317/100 |
| 3,648,167 A | 3/1972 | Purdy et al. | 324/158 T |
| 3,653,433 A | 4/1972 | Scharli | 165/80 |
| 3,788,393 A | 1/1974 | Plizak | 165/109 |
| 3,936,783 A | 2/1976 | Wagemer | 336/62 |
| 4,020,399 A | 4/1977 | Suzuki et al. | 361/331 |
| 4,029,141 A | 6/1977 | Ferrari et al. | 165/80 |
| 4,037,270 A | 7/1977 | Ahmann et al. | 361/385 |
| 4,093,971 A | 6/1978 | Chu et al. | 361/382 |
| 4,250,541 A * | 2/1981 | Chang et al. | 363/28 |
| 4,323,914 A | 4/1982 | Berndlmaier et al. | 357/82 |
| 4,327,348 A | 4/1982 | Hirayama | 336/184 |
| 4,334,267 A * | 6/1982 | Miko | 363/133 |
| 4,381,032 A | 4/1983 | Cutchaw | 165/46 |
| 4,422,056 A | 12/1983 | Roberts | 333/177 |
| 4,559,580 A | 12/1985 | Lutfy | 361/385 |
| 4,577,175 A | 3/1986 | Burgher et al. | 336/61 |
| 4,675,796 A | 6/1987 | Gautherin et al. | 363/20 |
| 4,707,726 A | 11/1987 | Tinder | 357/81 |
| 4,721,996 A | 1/1988 | Tustaniwskyj et al. | 357/82 |
| 4,768,581 A | 9/1988 | Gotwald et al. | 165/80.3 |
| 4,902,942 A | 2/1990 | El-Hamamsy | 315/276 |
| 4,964,198 A | 10/1990 | McCarthy | 24/458 |
| 5,001,601 A | 3/1991 | Fuoco | 361/385 |
| 5,023,695 A | 6/1991 | Umezawa et al. | 357/82 |
| 5,028,988 A | 7/1991 | Porter et al. | 357/81 |
| 5,036,384 A | 7/1991 | Umezawa | 357/82 |
| 5,210,440 A | 5/1993 | Long | 257/675 |
| 5,309,319 A | 5/1994 | Messina | 361/699 |
| 5,309,979 A | 5/1994 | Brauer | 165/80.2 |
| 5,329,419 A | 7/1994 | Umezawa | 361/699 |

(Continued)

Primary Examiner—Jeffrey Sterrett
(74) Attorney, Agent, or Firm—Schmeiser, Olsen & Watts

(57) ABSTRACT

A compact high-power pure-sinewave inverter amenable to mass manufacturing techniques. Methods for increasing the power rating, power density and/or power conversion efficiency of a sinewave-modulated pulse-width-modulated (PWM) inverter having a either half-bridge or full-bridge topology, including minimizing uncoupled inductances and loop inductances in the primary winding(s) by employing either ribbon-like conductors having a high crossectional aspect ratio or litz-wire. A compact linear heatsink adapted to cool a row of semiconductor devices (such as inverter switches) mounted on a high-current printed circuit board. Methods for inexpensive manufacture of a fluid-cooled linear heat sink. A transformer including a filter inductor core.

22 Claims, 21 Drawing Sheets

U.S. PATENT DOCUMENTS

| | | | |
|---|---|---|---|
| 5,331,536 A * | 7/1994 | Lane | 363/126 |
| 5,335,163 A | 8/1994 | Seiersen | 363/126 |
| 5,426,409 A | 6/1995 | Johnson | 336/178 |
| 5,428,897 A | 7/1995 | Jordan et al. | 29/890.03 |
| 5,430,426 A | 7/1995 | Griebel | 336/232 |
| 5,466,970 A | 11/1995 | Smithers | 257/712 |
| 5,504,924 A | 4/1996 | Ohashi et al. | 375/800 |
| 5,549,155 A | 8/1996 | Meyer, IV et al. | 165/104.33 |
| 5,586,004 A | 12/1996 | Green et al. | 361/699 |
| 5,606,201 A | 2/1997 | Lutz | 257/714 |
| 5,725,050 A | 3/1998 | Meyer, IV et al. | 165/104.33 |
| 5,731,666 A | 3/1998 | Folker et al. | 315/276 |
| 5,783,984 A | 7/1998 | Keuneke | 336/155 |
| 5,829,516 A | 11/1998 | Lavochkin | 165/80.4 |
| 5,835,367 A * | 11/1998 | Pan et al. | 363/61 |
| 5,883,426 A | 3/1999 | Tokuno et al. | 257/686 |
| 5,896,270 A | 4/1999 | Tsui | 361/704 |
| 5,907,479 A | 5/1999 | Leu | 363/16 |
| 5,915,463 A | 6/1999 | Romero et al. | 165/80.3 |
| 6,014,071 A | 1/2000 | Onishi et al. | 336/170 |
| 6,016,251 A | 1/2000 | Koide et al. | 361/699 |
| 6,028,779 A | 2/2000 | Sakamoto et al. | 363/55 |
| 6,038,156 A | 3/2000 | Inam et al. | 363/133 |
| 6,046,664 A | 4/2000 | Weller et al. | 336/212 |

* cited by examiner

LEFT SIDE VIEW

TOP VIEW

SECTION A-A

DETAIL
(SECTION A-A)

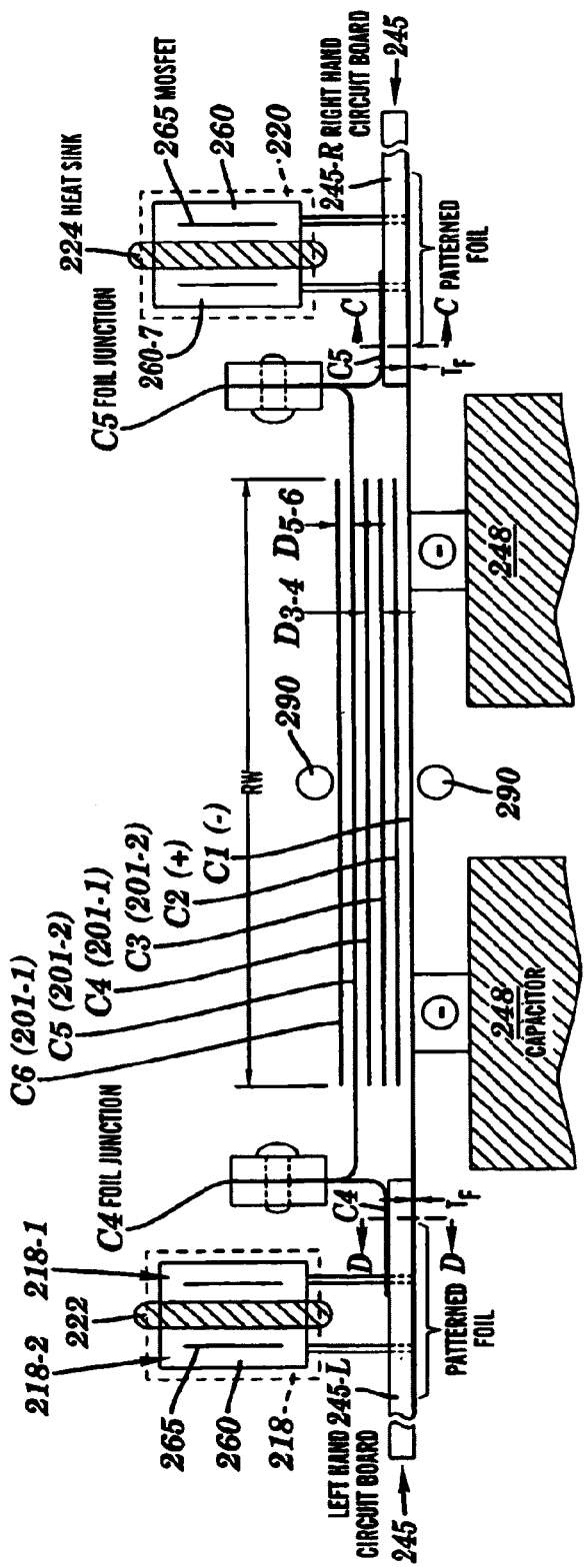
FIG. 3B SECTION B-B
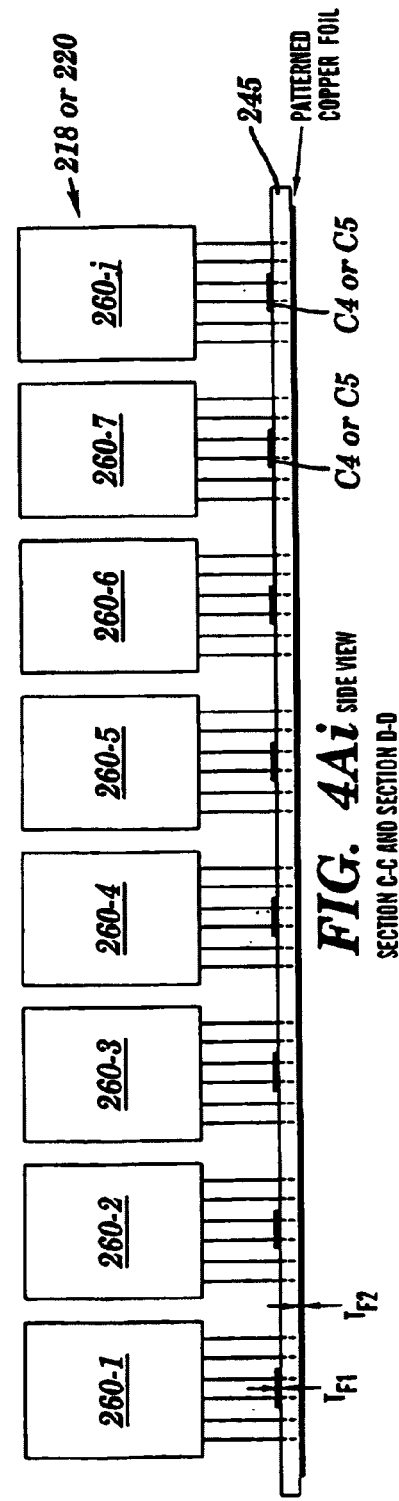
FIG. 4Ai SIDE VIEW
SECTION C-C AND SECTION D-D

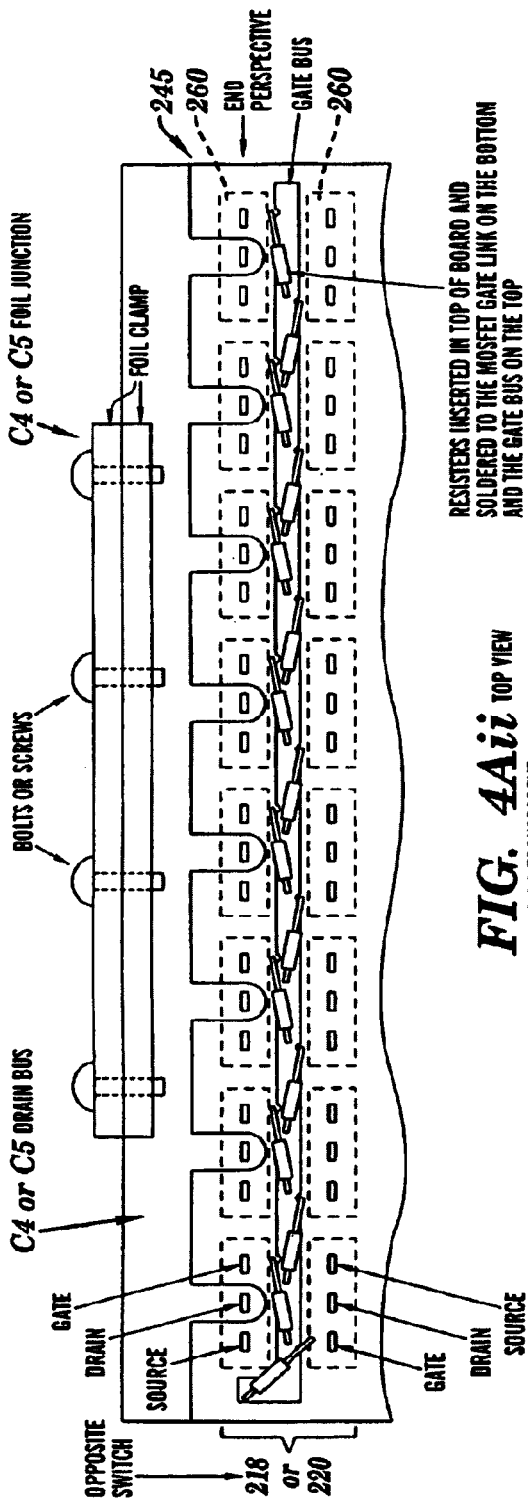
FIG. 4Aii TOP VIEW
260 TRANSPARENT
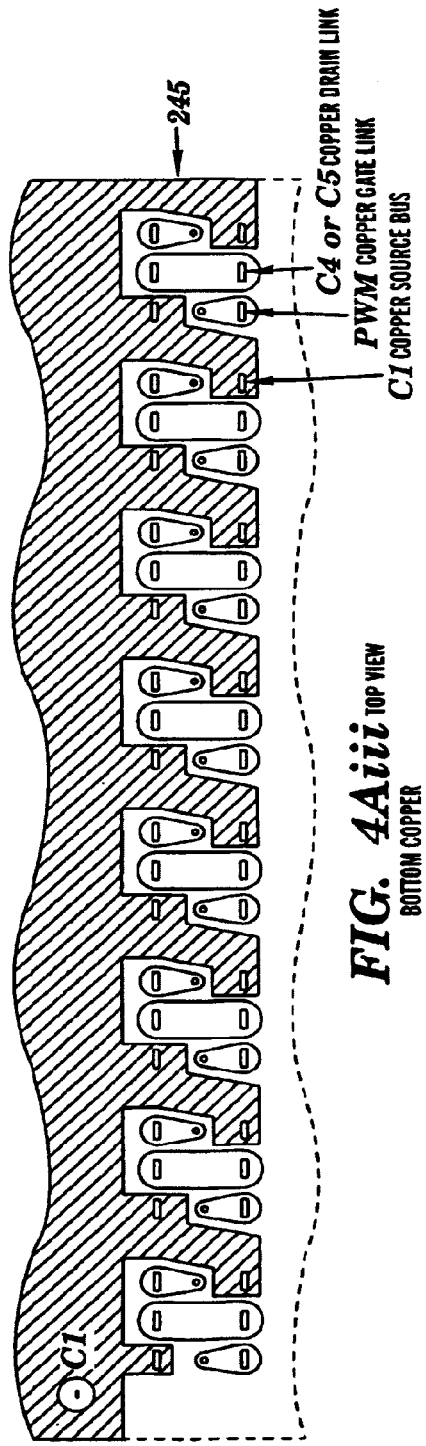
FIG. 4Aiii TOP VIEW
BOTTOM COPPER

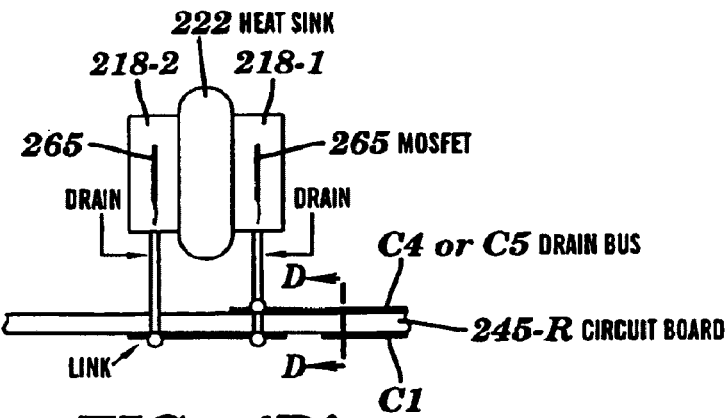
FIG. 4Bi
SECTION THROUGH MOSFET DRAIN LEADS
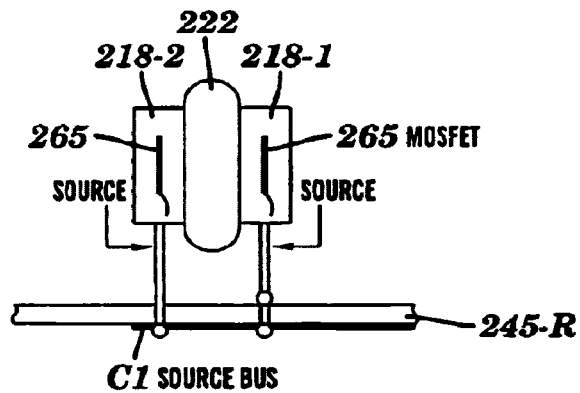
FIG. 4Bii
SECTION THROUGH MOSFET SOURCE LEADS
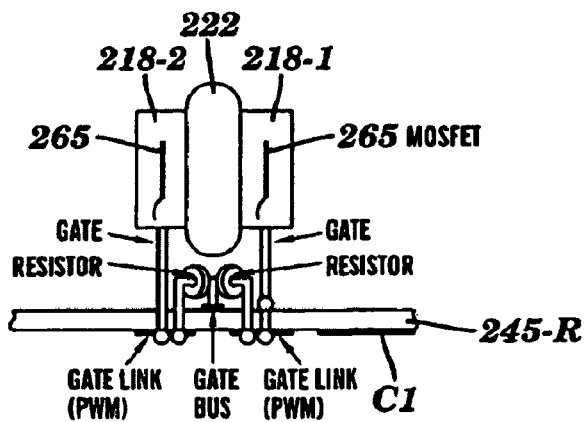
FIG. 4Biii
SECTION THROUGH MOSFET GATE LEADS

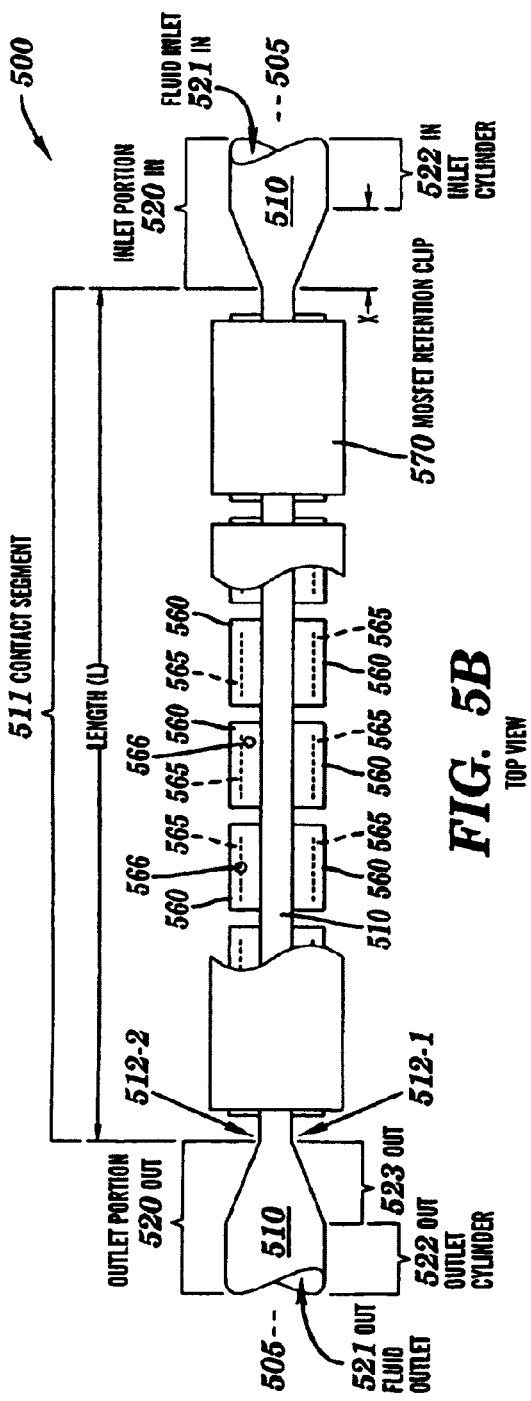
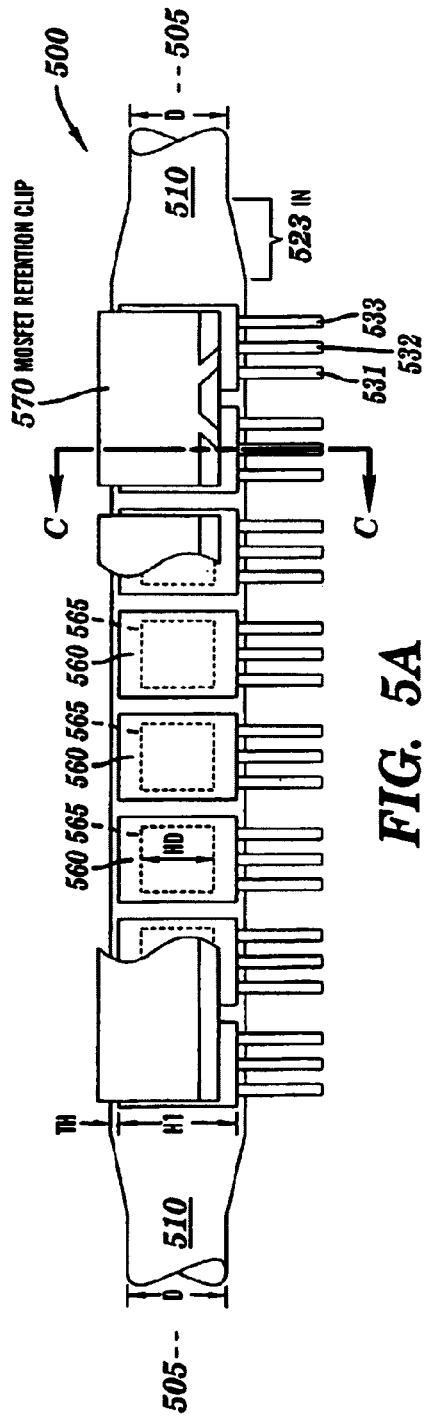
FIG. 5B
TOP VIEW
FIG. 5A
SIDE VIEW

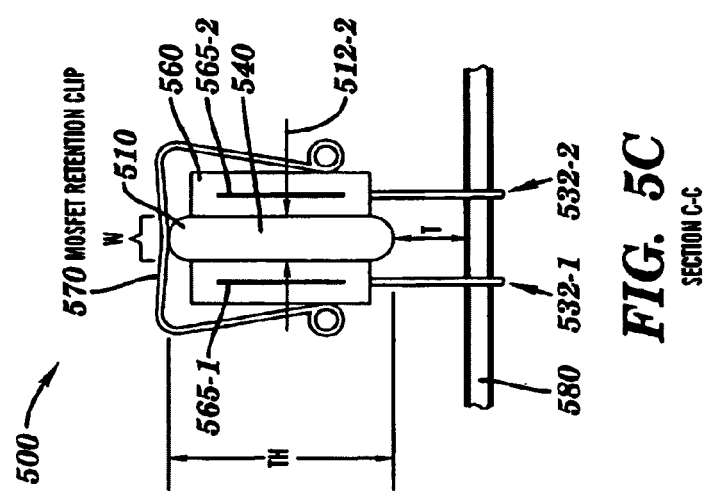

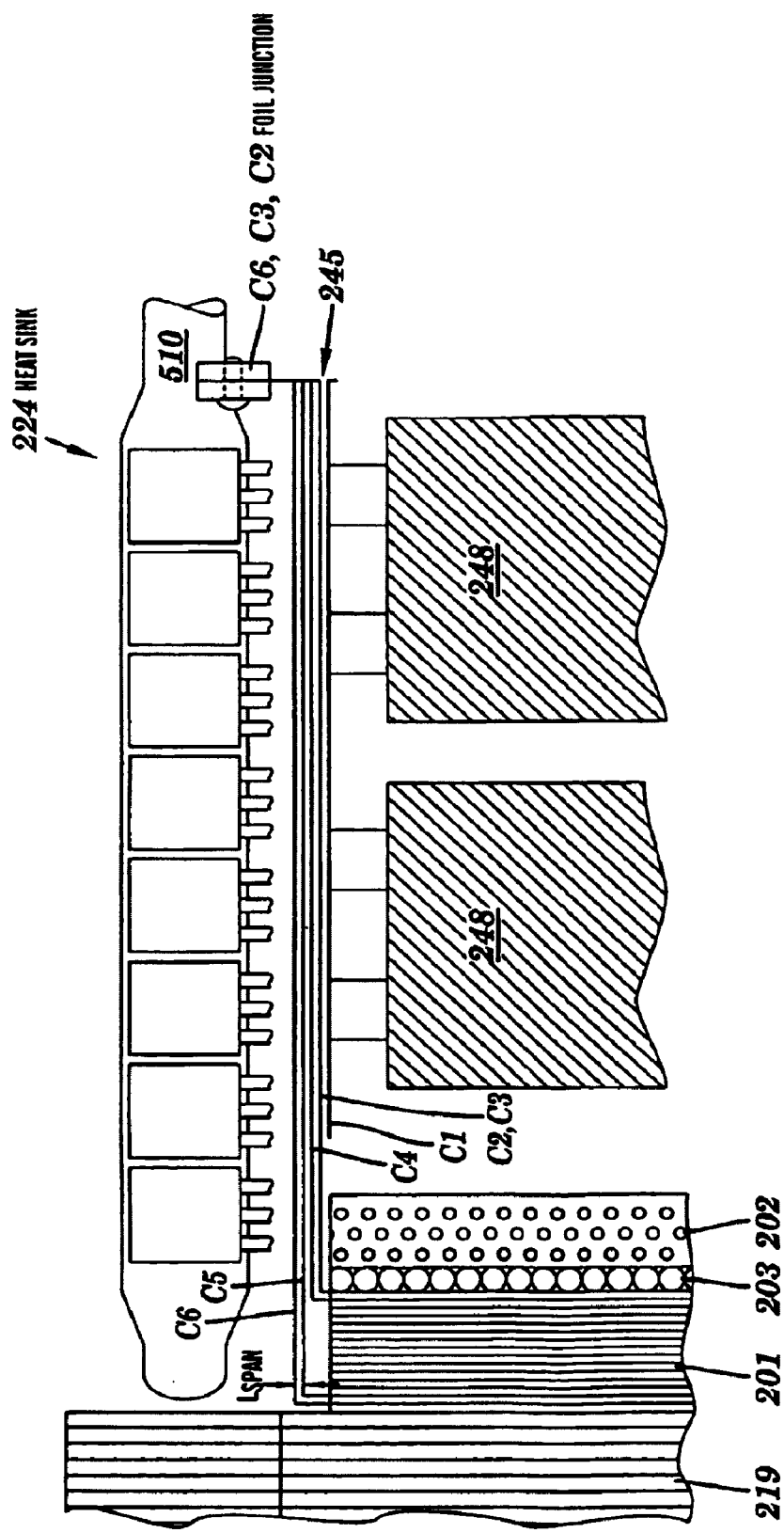
FIG. 7A1
DETAIL B

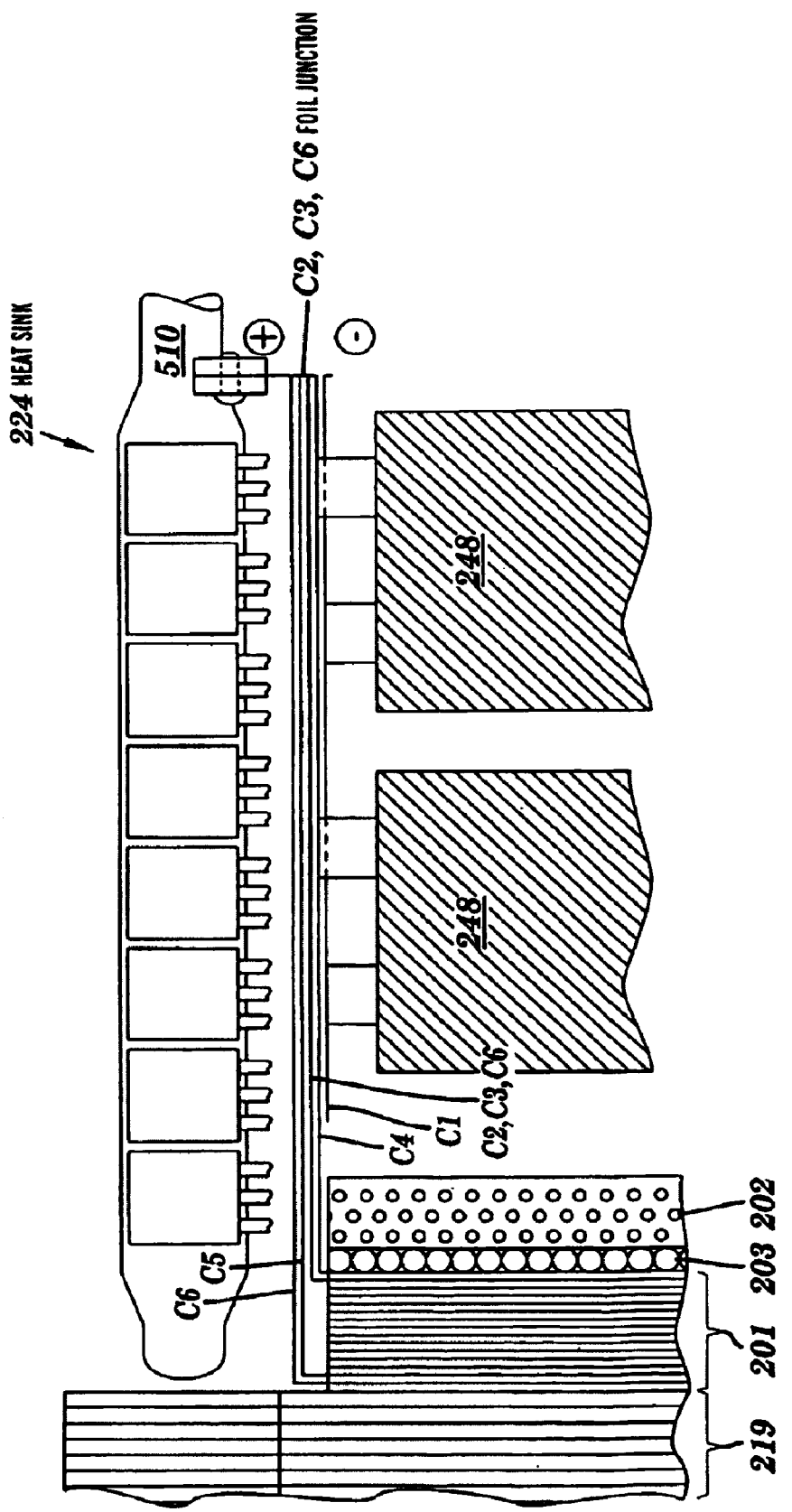
FIG. 7A2
DETAIL B

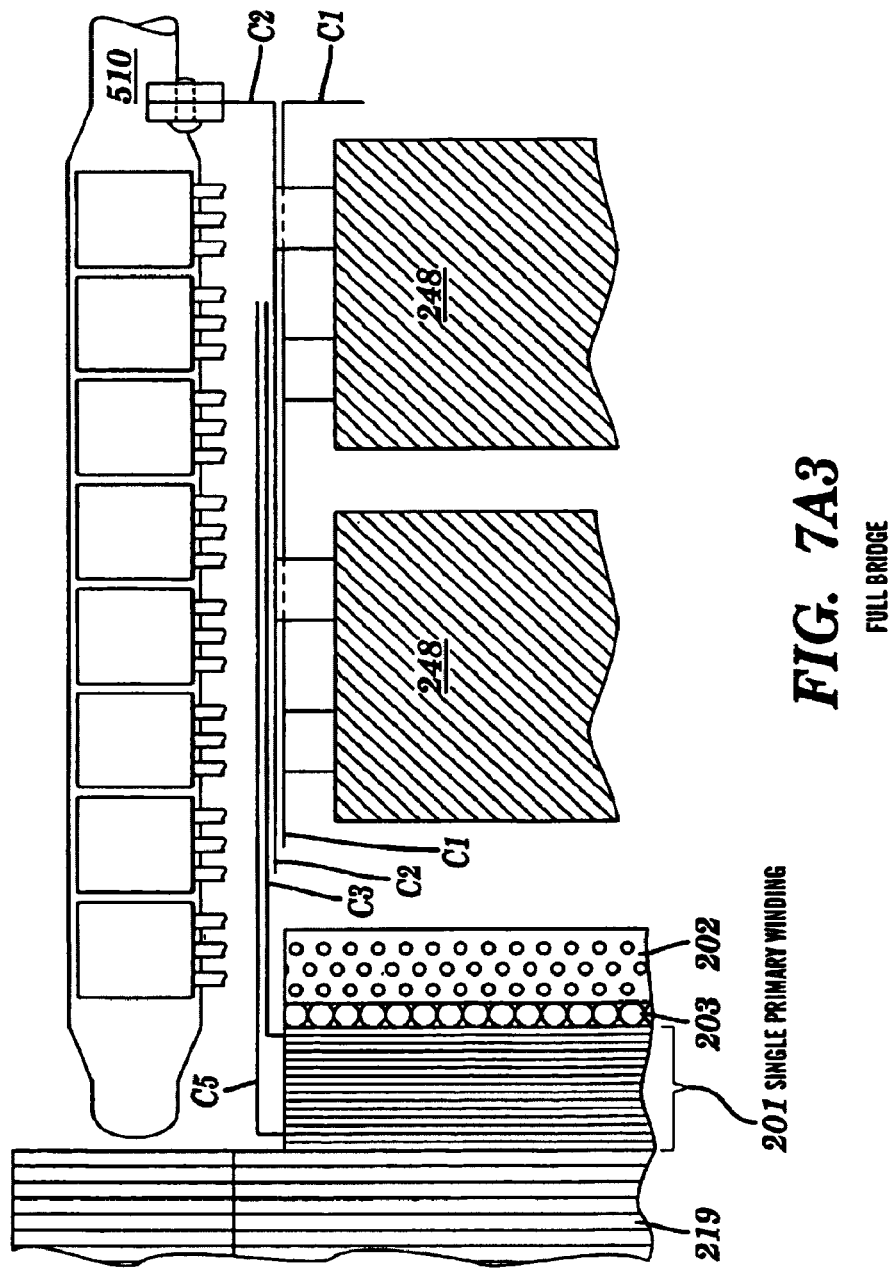
FIG. 7A3
FULL BRIDGE

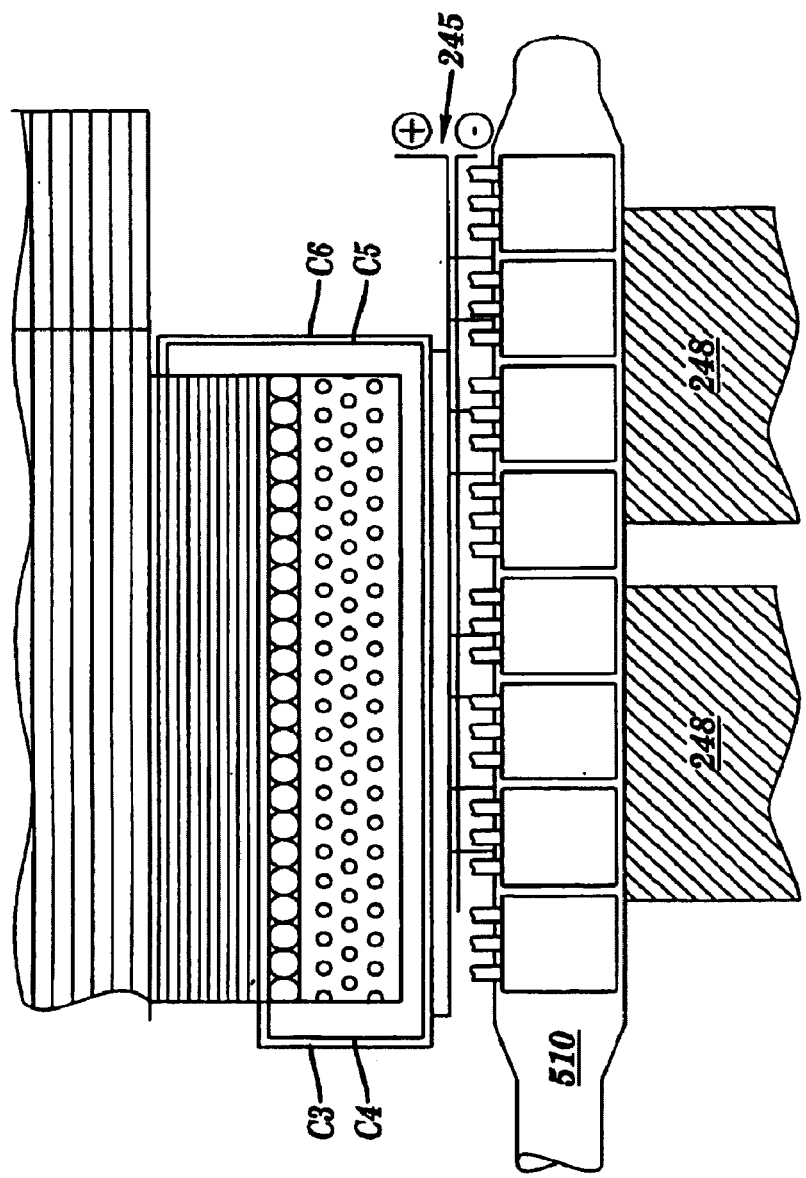
FIG. 7A4

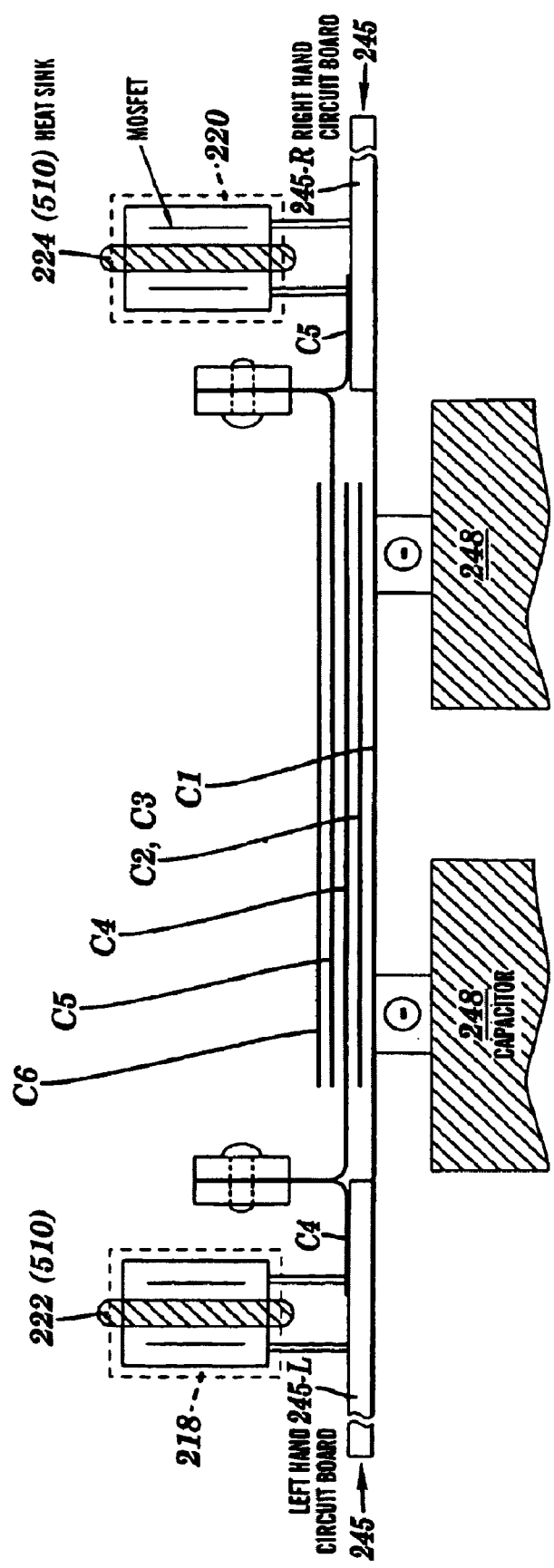
FIG. 7B1
SECTION B-B

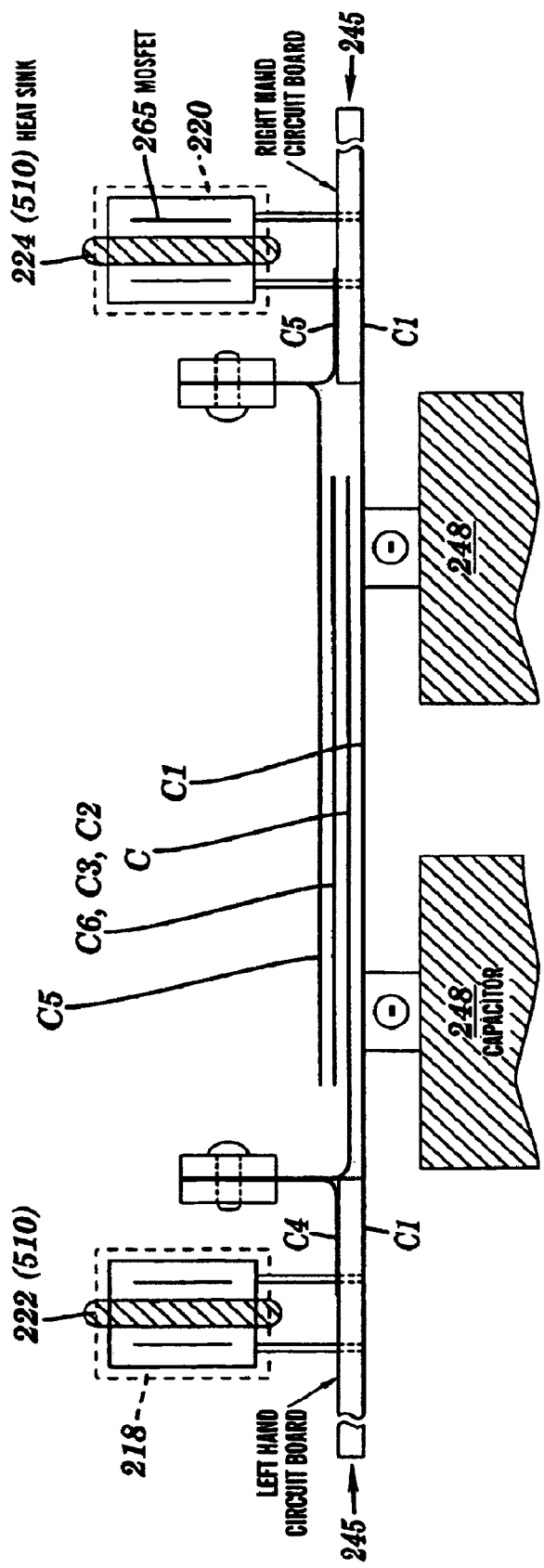
FIG. 7B2 SECTION B-B

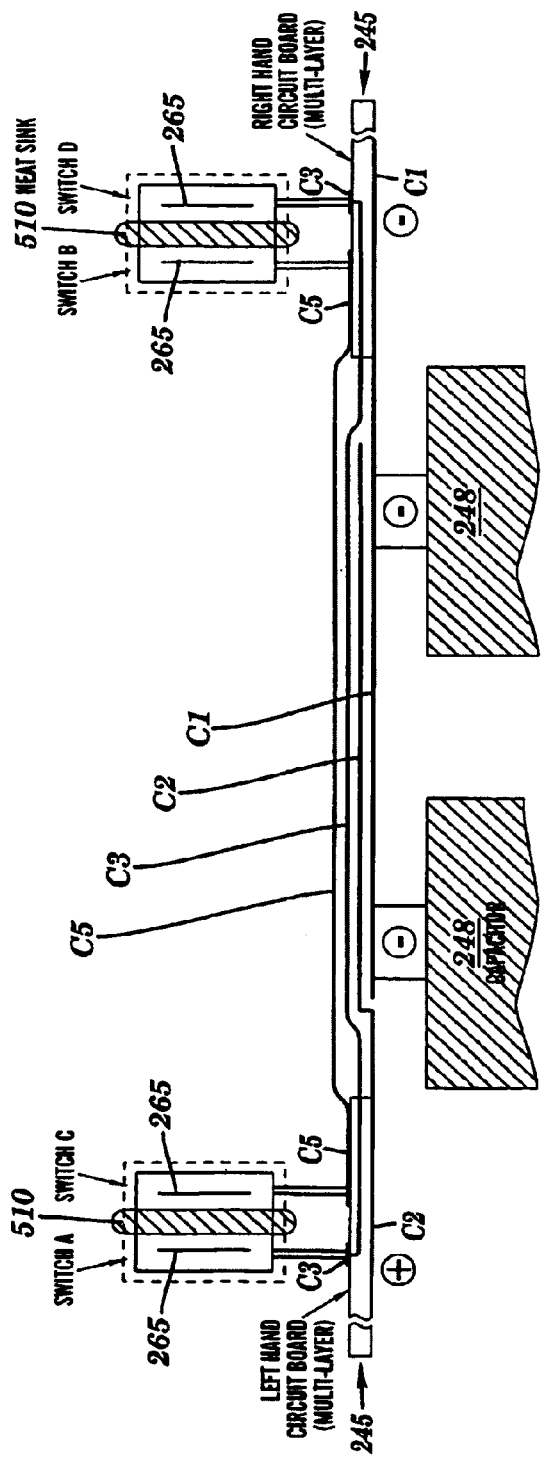
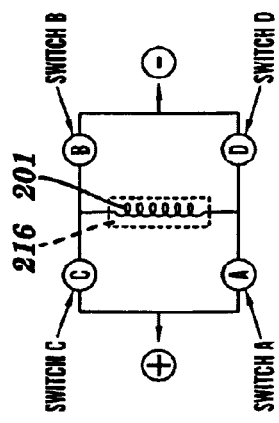
FIG. 7B3
FULL-BRIDGE
FIG. 7C3

HIGH POWER DENSITY INVERTER AND COMPONENTS THEREOF

BACKGROUND OF THE INVENTION

1. Technical Field

The invention relates generally to switching power conversion devices, and more specifically to high power-density DC-to-AC inverters.

2. Related Art

Growing public concern about the accelerating depletion of the Earth's supply of fossil fuels (e.g., crude oil) and of other contemporary non-renewable energy sources, and energy-related environmental concerns such as pollution and global warming due to emissions, have accelerated the development of alternative energy generation technologies (e.g., fuel cells, photovoltaics, wind power, biomass, tallow trees, etc.) for generating power. Growing concerns about the reliability of local, state and national power distribution infrastructures have promoted interest in on-site power generation technologies, particularly those which are compact enough to be maintained on a private premises while providing enough power to satisfy average power requirements of a home, of a business, or of a cooperating community. Thus, a growing popular demand for technologies for independent production of electric power on the premises of individual homes and businesses, particularly solar-electric arrays and fuel cells, has increased the need for efficient and compact high-power inverters that can convert the Direct Current (DC) typically generated by devices employing such technologies, into the Alternating Current (AC) required to operate most commercially available home appliances and computer equipment. The higher the power-density (i.e., the maximum continuous power rating per unit of volume) of an inverter assembly, the less raw material may be required for its production, and the more convenient its transportation and installation, and concealment on premises can be. Some special applications for high-power inverters, i.e., for powering computers and appliances in individual homes built in remote wilderness settings, or even for powering remote extraterrestrial facilities (e.g., laboratories in orbit, or on the moon, or on other planets), may impose an even stricter necessity for true sine-wave output with a minimization of power inverter volume, or component count, and/or mass per kilowatt of rated capacity.

Pure sine-wave generating inverters generally include semiconductor transistor (e.g., Field Effect Transistor (FET), or insulated-gate bipolar transistor (IGBT)) switches controlled by sine-wave modulated pulse-width-modulated (PWM) signals. The frequency of switching is held constant (e.g., at a frequency higher than the human audio range, e.g., switching frequencies between about 20 kHz–30 kHz) while duty cycles of the alternating switches powering the primary windings are varied to produce an approximately smooth changing (alternating) potential at the secondary winding. The switches interrupt DC currents supplied to a transformer from a DC voltage source (e.g., a battery, solar array) and will generate heat during switching operation. Modified sine-wave inverters also include switches, which are used to generate pulses of alternating voltages of modulated width and fixed voltage. Both pure sine-wave inverters and modified sine-wave inverters may require a low-pass L-C output filter tuned to selectively pass the AC output frequency (e.g., 50 Hz or 60 Hz) to reduce distortion and/or remove high frequency noise. Such filters generally comprise a transformer-output filter inductor and an output filter capacitor coupled to the terminals of the secondary winding of the transformer.

Overheating of the switches often leads to damage to the switches and/or to a failure of the inverter. The heat generated in the switches is wasted energy that reduces the power conversion efficiency of the inverter and tends to limit the maximum power-output, and hence the maximum power-density and/or efficiency, of the inverter. The heat developed in the switches in an inverter generally increases at least proportionally with the frequency of the switching. The related art teaches that it is "difficult to operate a sine-wave-modulated PWM push-pull inverter at switching frequencies higher than approximately 1 kHz". Mohan, POWER ELECTRONICS, p. 127 (John Wiley & Sons). The academic authorities also teach that PWM push-pull inverters (e.g., producing pure sine-wave output at high efficiency) are generally limited to being "Small Power" (e.g., on the order of 1 KW, e.g., 3 KW or less) inverters, compared to a full-bridge switching inverter having the same size transformer. See. e.g., Constantine Hatziadoniu, http://www.engr.siu.edu/staff/hatz/EE483/A7/sld013.htm Therefore, although sine-wave-modulated PWM push-pull inverters require half as many switches as full-bridge (e.g., "H" bridge) inverters, they are generally unavailable as compact and high-power true sine-wave output inverters. The size of an inverter (and hence its power-density) is significantly affected by the size of its power transformer, as well as by the number and size of other inverter components such as capacitors, switch banks, heat sinks, and output filter inductors.

SUMMARY OF THE INVENTION

The invention provides configurations of various conventional and novel components to make a high power density inverter that is amenable to mass manufacturing techniques employing conventional assembly techniques such as printed circuit board fabrication, robotic component placement and wave soldering etc.

A first aspect of the invention provides a switching inverter comprising: a first primary winding connected in series to a first switch and a DC voltage source; a second primary winding connected in series to a second switch and the DC voltage source; wherein the first primary winding and the second primary winding include ribbon-like conductors each having a thickness RIBBONTHICKNESS; wherein a first coil segment of the first primary winding and a second coil segment of the second primary winding are wound coaxially around a transformer core; wherein the first winding and the second winding are approximately parallel separated by a dielectric layer, and the distance between the cross-sectional centroid of the first winding and the cross-sectional centroid of the second winding is not greater than 2×RIBBONTHICKNESS, and wherein each of the ribbon-like conductors has an aspect ratio of at least 100.

Another aspect of the invention provides an inverter comprising: a first primary winding conductor connected in series to a first sinewave-modulated pulse-width-modulated (PWM)-controlled switch and a DC voltage source, the first switch being a first composite switch including a first plurality of semiconductor switches mounted in at least one row on a first portion of printed circuit-board; a second primary winding conductor connected in series to a second sinewave-modulated PWM-controlled switch and the DC voltage source, the second switch being a second composite switch including a second plurality of semiconductor switches mounted in at least one row on a second portion of a printed circuit-board; wherein the first primary winding and the second primary winding have a minimized uncoupled inductance such that more than 100 amperes of current in the primary windings can be switched perpetually at frequencies greater than 2,000 Hz by the PWM-controlled switches.

Another aspect of the invention provides a switching inverter comprising a transformer including a first primary winding conductor connected in series to first switch and a DC voltage source and a second primary winding conductor connected in series to a second switch and the DC voltage source; wherein the first primary winding conductor and the second primary winding conductor respectively comprise a first plurality of parallel wire conductors and a second plurality of parallel wire conductors, each plurality of parallel wire conductors being intertwined with the other to form a litz-wire dual primary winding, the litz-wire dual primary winding being wound around the core of the transformer.

The present invention satisfies the need for a compact and inexpensively manufactured cooling apparatus, and methods of constructing the same, for use in the manufacture of high power-density inverters and in other devices having heat-generating chip packages. Accordingly, the inverter disclosed herein may include a compact and inexpensively manufactured cooling apparatus, such as a fluid-cooled linear heat sink in thermally conductive abutting contact with each heat-generating electronic component of a plurality of heat-generating electronic components aligned in at least one row, the heat sink having a first flat exterior surface abutted to a flat side of each component aligned in the at least one row.

The cooling apparatus may comprise a fluid conduit having substantially uniform wall thickness and a substantially uniform perimeter P formed from a thermally conductive material (e.g., which may be formed from a single tubular piece of a thermally conductive material having circumference P) and having a contact segment, wherein the contact segment has a first flat exterior surface, and wherein the first flat exterior surface has a height H1, wherein the height H1 is approximately equal to or greater than $P/\pi$. The height H1 may be equal to or greater than the height of a chip or chip package to be cooled. The invention further provides a method for making the a linear fluid-cooled heat sink having two flat sides, the method comprising: providing a linear fluid conduit having substantially uniform wall-thickness within each of two side areas and a substantially uniform crossectional perimeter P; providing a anvil having two flat surfaces inside of the linear fluid conduit and between the two side areas; pressing each of the two side areas of the fluid conduit against the flat surfaces of the anvil so as to form the two flat sides.

The present invention further provides an inverter comprising: an inductor core; a transformer including; a transformer core; a first coil wound around the transformer core; a second coil wound around the transformer core and around the inductor core. The first coil may be a "primary winding" or a "secondary winding" of the transformer. Reciprocally, the second coil may be a "secondary winding" or a "primary winding" of the transformer.

BRIEF DESCRIPTION OF THE DRAWINGS

Embodiments of the present invention will be described in detail, with reference to the following figures, wherein like designations denote like elements, and wherein:

FIG. 3B depicts a cross-sectional view, from a front perspective, of a portion of the inverter of FIG. 2C within the detail area delineated in FIG. 2D;

FIG. 4Ai–4A-iii depict views of an inventive high-current circuit board illustrating foil patterns for mounting multiple semiconductor switch chip packages in parallel lines to form a single PWM-controlled composite switch;

FIG. 4Ai depicts the cross-sectional view of the high-current circuit board for a composite switch along section C—C and/or section D—D of FIG. 3B;

FIG. 4Aii depicts a top view of the high-current circuit board of a composite switch wherein the linear heat sink is omitted for clarity of illustration;

FIG. 4Aiii depicts a top (x-ray) view of the bottom patterned copper foil of the high-current circuit board of the composite switch.

FIG. 4Bi depicts a cross-section of the left composite switch circuit board assembly of FIG. 3B through the MOSFET-drain leads;

FIG. 4Bii depicts a cross-section of the left composite switch circuit board assembly of FIG. 3B through the MOSFET-source leads;

FIG. 4Biii depicts a cross-section of the left composite switch circuit board assembly of FIG. 3B through the MOSFET-gate leads;

FIGS. 5A–5C depict views of an inventive chip-cooling assembly, including an inventive fluid-cooled heat sink;

FIG. 5A depicts a side view of an inventive fluid-cooled assembly including a cooling apparatus and a plurality of heat generating devices clamped thereon by a plurality of binder clips (cut away);

FIG. 5B depicts a top view of the assembly of FIG. 5A;

FIG. 5C depicts a cross-sectional view from an end perspective, of the assembly of FIG. 5A further including a printed circuit board;

FIG. 6A depicts a first step for forming the heat sink, that of inserting wedge A1 and wedge A2 inside of a round pipe to be formed into the heat-sink;

FIG. 6B depicts a second step for forming the heat sink, that of inserting wedge B inside of the round pipe and so as to force wedge A1 and wedge A2 apart;

FIG. 6C depicts the third step for forming the heat sink, that of inserting wedge B entirely through (the contact section of) the pipe and so as to form a composite anvil, while compressing the (contact section) of the pipe between the flat jaws of a vice;

FIGS. 7A1 and 7B1 depict side and front cross-sections of an alternative embodiment of the inverter of FIGS. 2A–2D wherein the length of each primary winding has been shortened and adjacent isoelectric conductors have been merged;

FIGS. 7A2 and 7B2 depict side and front cross-sections of an alternative embodiment of the inverter of FIGS. 7A1 and 7B1 wherein the isoelectic (center-tapped) conductors have been brought into direct contact or merged;

FIGS. 7A3 and 7B3 depict side and front cross-sections of an alternative embodiment of the invention wherein the inverter is full-bridge inverter comprising a single primary winding and four PWM-controlled switches;

FIGS. 7C3 depicts a circuit diagram of the full-bridge inverter of FIGS. 7A3 and 7B3;

FIG. 7A4 depicts an alternative embodiment of the inverter of FIG. 2A wherein the length of the dual primary windings is minimized by compact arrangement and folding of the foil conductors;

Although the drawings are intended to illustrate embodiments of the present invention, the drawings are not necessarily drawn to scale. Various miscellaneous elements and devices that would be practical or necessary for the reliable operation of the disclosed apparatus, but which would be known understood, assumed, and supplied by persons skilled in the art as a matter of convention, have been generally omitted from the figures for the sake of clarity of illustration. Such devices omitted in the figures that may be incorporated into embodiments of the invention by persons skilled in the art of transformer or inverter manufacture, of appliance construction and/or of plumbing may include screws, nuts, bolts, brackets, braces, DC power cords, wires, wiring harnesses, insulation, dielectric (insulative) layers, sensors (e.g., current, voltage, temperature), meters (e.g., volts, amps, watts), indicator lights (e.g., "DC power on", "AC power on" "conditions normal"), manual switches (e.g., "on", "off", "reset"), PWM switch-control signal generating circuits (e.g., sine-wave modified duty-cycle at greater than 10 kHz), monitoring circuits (e.g., overvoltage protection circuits, ground fault interrupt circuits, overcurrent trip circuits), AC electrical receptacles, hoses, tubes, pipe fittings, clamps, plumbing components, etc.

DETAILED DESCRIPTION OF THE INVENTION

Although some embodiments of the present invention will be shown and described in detail, it should be understood that various changes and modifications may be made without departing from the scope of the appended claims. The scope of the present invention will in no way be limited to the number of constituting components, the materials thereof, the precise size and shapes thereof, the frequencies therein, the relative polarities, magnitude or ratio of voltages or currents therein, etc.

Figure 1:
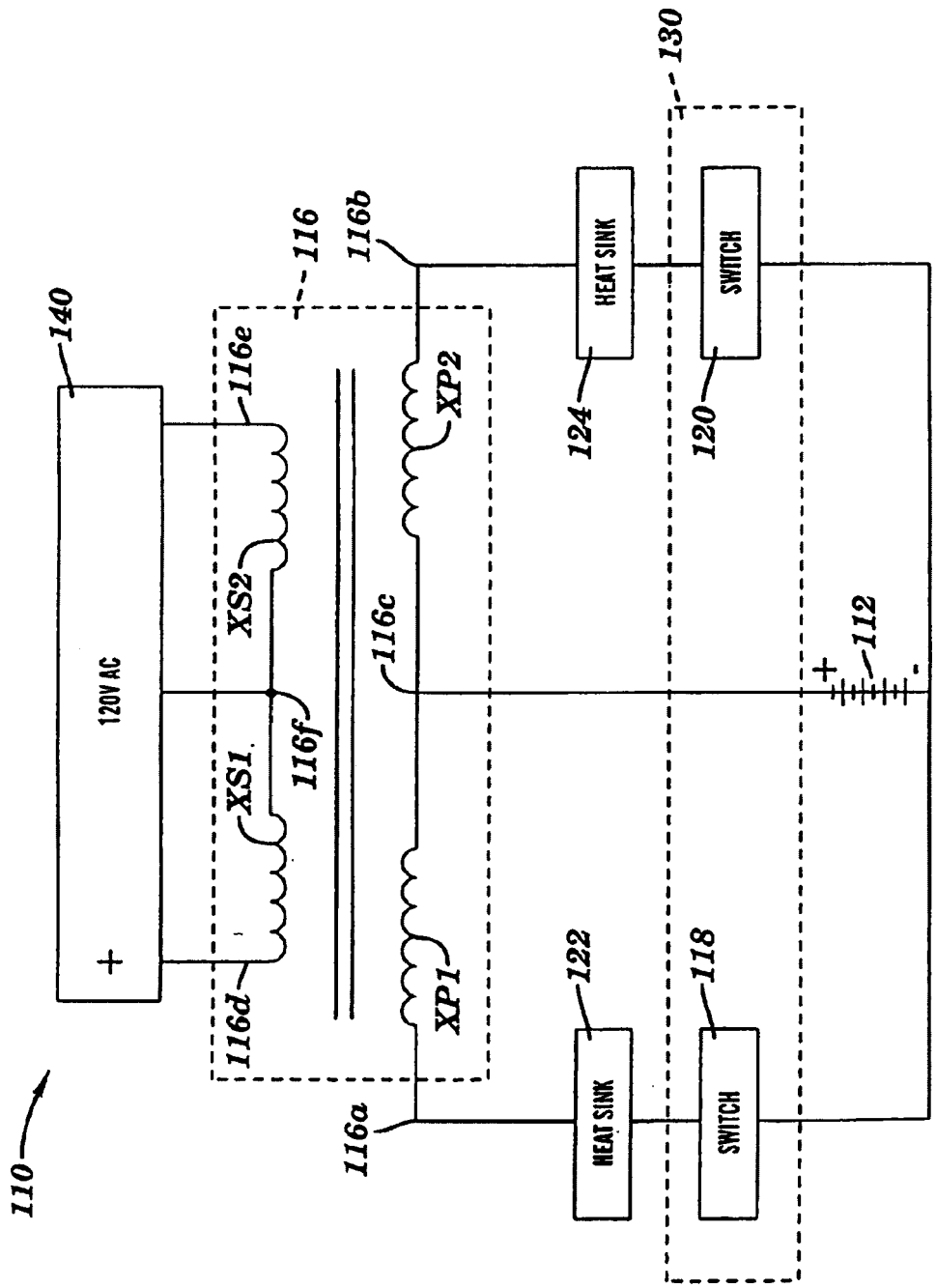
FIG. 1 is FIG. 2 of U.S. Pat. No. 6,038,156 and depicts a circuit diagram of a push-pull inverter having a relatively large distance between the conductors of the first and second primary windings in accordance with the related art.

FIG. 1 is a reproduction of FIG. 2 of U.S. Pat. No. 6,038,156 and is therein described. The disclosure of U.S. Pat. No. 6,038,156 is hereby incorporated herein by reference. FIG. 1 depicts a circuit diagram of a related art push-pull inverter 110. The inverter has a center-tap (at node 116c) in the dual primary windings (e.g., windings XP1 and XP2) of the power transformer 116 and has a relatively large distance between the conductors (e.g., 116a and 116b) of the first and second primary winding circuits in accordance with the teachings of the related art. In particular, a large metal heat sink (e.g. 122 and 124) is disposed within the circuit path of the primary winding between the respective coils (e.g., XP1 and XP2) thereof in the transformer and the switches thereof (e.g, 118 and 120). Accordingly, the circuit path of each primary winding is somewhat serpentine between the transformer and its switch. FIG. 3 of U.S. Pat. No. 6,038,156 further teaches that in push-pull inverters of the related art, the merged center-tapped conductor(s) (116c) emerging from the transformer 116 shall be physically distanced from both of the primary winding conductors (116c and 116b) that emerge from the other end of the transformer 116 and connect to their respective switches (e.g., 122 and 124 respectively)

Inverters constructed in accordance with the design of FIG. 1 typically do not exceed a few (e.g., a rated three) kilowatts of output power, and produce only modified sinewave output.

High Power-Density Inverter

High Power Density Inverters in accordance with embodiments of the present invention can be constructed in at least two different switching topologies: 1) Push-Pull (a/k/a "half-bridge") topology as shown in FIGS. 2A–3B; and 2) Full-Bridge (a/k/a/ "H"-bridge) topology as depicted in FIGS. 7A3, 7B3 and 7C3.

Figure 2A:
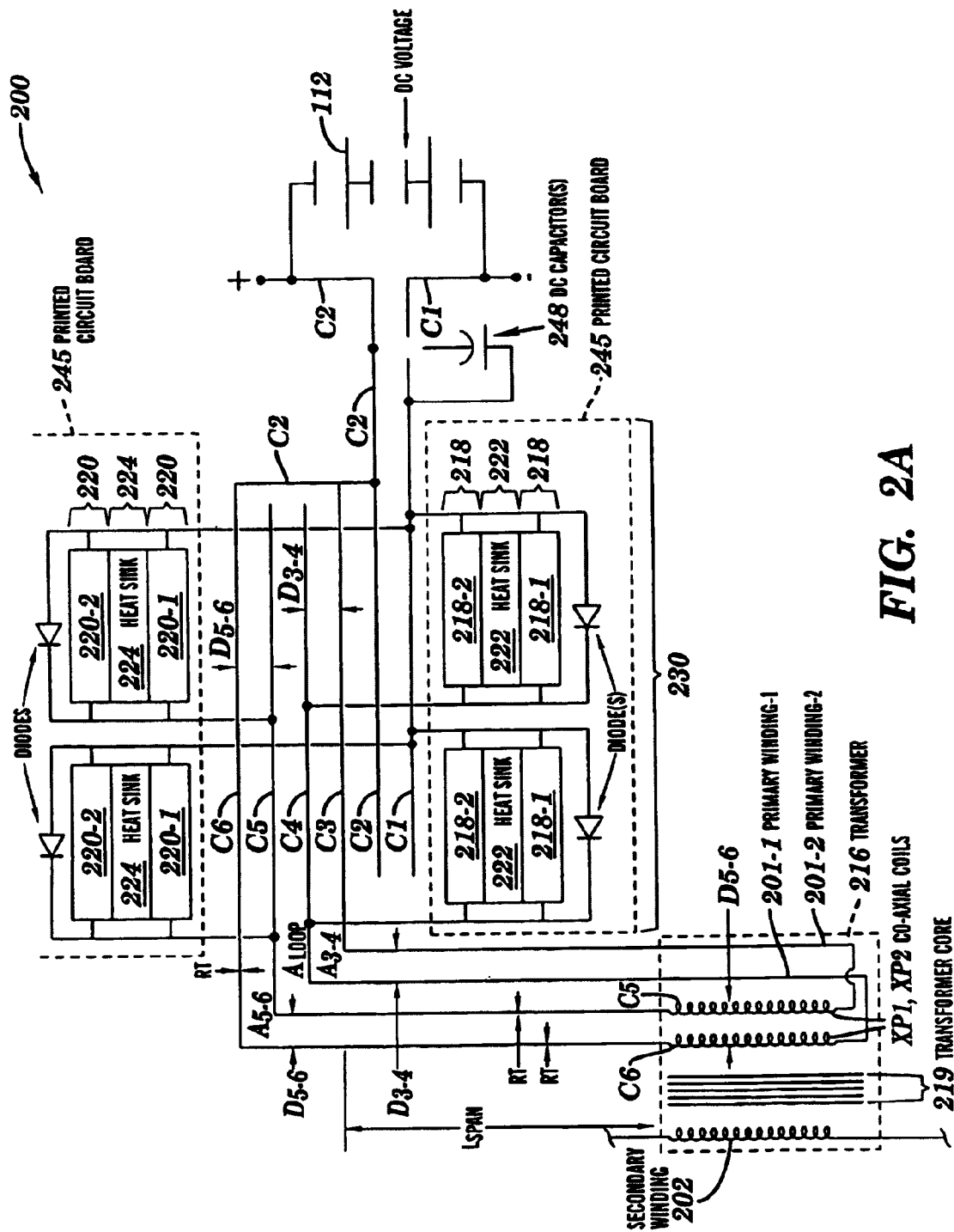
FIG. 2A depicts a hybrid circuit-physical layout diagram of a high power-density sine-wave modulated PWM push-pull inverter having a minimized distance between the conductors of the first and second primary winding circuits in accordance with embodiments of the present invention.

In the Push Pull topology of FIG. 2A, the primary winding of the transformer 216 is made up of two almost identical wound conductors (201-1 and 201-2) which are physically separate electrically insulated from each other within the transformer 216. The switches connect each of this winding alternately to the DC source. These dual primary windings (201-1 and 201-2) must have as perfect a magnetic coupling as possible, so that when a winding is switched off, the current in that winding appears instantaneously in (is transferred to) the other winding to maintain the same Ampere-Turns in the entire primary winding (consisting of the two separate primary windings) before and after the switching. Perfect coupling is possible only if the conductors of the two windings occupy the same physical space and have zero cross-sectional area, which of course is impossible. Thus in reality, the physical construction of the inverter should be such as to approach this ideal relationship. Any substantial deviation from such perfect coupling results in high spikes during turnoff of current in that winding due to the L di/dt effect, where L is the inductance of either of the two primary windings associated with the lack of perfect magnetic coupling between the two windings within the transformer 216 and any current path external to the transformer 216 (e.g., between the DC supply, through the switches etc.).

The more compact the current paths outside of the transformer 216 are made, the less is the uncoupled inductance L of each primary winding. Reduction of L allows higher di/dt for a given maximum value for the Voltage across the switches. Higher di/dt in turn enables higher switching frequency. Higher switching frequency, reduces the size of the filter components on the output of the transformer to obtain smooth 60/50 Hz. sine wave output voltage (thus allowing reduction of the inverter's enclosure volume). Higher switching speed also reduces the switching losses, thus enhancing overall inverter efficiency. Higher switching speeds also reduces the size of snubber components needed to keep the voltage spikes across the switches (e.g., semiconductor switches) from reaching dangerous values.

In the "H Bridge" topology (shown in FIG. 7A3, 7B3 and 7C3), there is only one primary winding 201 within the transformer (comprised of conductor C3-C5). Each end of the single primary winding 201 is connected to two switches (end C3 is connected to switch A and switch D; end C5 is connected to switch B and switch C). One of the switch (e.g., switch A) at a given end (e.g. C3) connects that end (C3) of the winding 201 to the positive (+) terminal of the DC supply while the second switch (e.g., switch D) connected to the same end connects it to the negative (−) terminal of the DC supply. Similarly the two switches (switch C and switch B) connected to the other end (C5) of the primary winding 201 also enable the connection of that end (C5) to the positive (+) and the negative (−) terminals respectively of the DC supply. The two pairs (A paired with B) and (C paired with D) of the switches are turned on and off alternately so as to connect one end (e.g. C3) of the winding to the positive of the DC supply while the other end (e.g.,C5) is connected to the negative of the DC supply, thereby applying full DC voltage across the winding. The direction of the application of the DC voltage is alternated by alternately switching the proper switches in correct sequence, as is well understood by persons skilled in the art. During switching, only the current through the switches changes instantaneously. The current through the conductor within the transformer does not change instantaneously due to inductance of the primary winding 201. The inductance of the distinct current loops formed by the DC supply and through the switches connected to one ends of the transformer winding needs to be minimized, to minimize the L di/dt voltage spikes appearing across the switches. This applies individually to each of the two loops formed by such paths resulting from the switches connected to the two ends of the transformer winding. Minimizing these inductances results in the benefits to the design and operation of the inverter similar to embodiments of the invention employing the "Push Pull" topology.

One objective of the present invention is to configure various components in the inverter to minimize uncoupled inductances in the primary winding(s) to realize benefits and thus allow operation of the inverter at higher powers and higher power densities at higher switching frequencies and higher efficiencies than hitherto has been practicable.

The Push-Pull (Half-Bridge) Topology

FIG. 2A depicts a hybrid circuit diagram and partial physical-layout diagram of a high power-density sine-wave modulated PWM push-pull inverter (200), in accordance with embodiments of the present invention. The inverter (200) is characterized by dual ribbon-shaped primary windings that are close and approximately parallel to each other, that is, being a small and approximately equal distance apart everywhere outside of a switch block(s) 230. FIG. 2A depicts a substantially uniform minimized distance (e.g., distance $D_{5-6}$ or approximately equal distance $D_{3-4}$) between the cross-sectional centroids of a ribbon-like conductor of the first (201-1) and a ribbon-like conductor of the second (201-2) primary winding circuits, in accordance with embodiments of the present invention. The "cross-sectional centroid" of the ribbon conductor (i.e., ribbon-shaped conductor) of each winding is a point along the (longitudinal) centroidal axis of the ribbon conductor in the plane of the cross-section which is perpendicular to the centroidal axis. For example, given a ribbon conductor to be used as a primary winding and having a ribbon-thickness (RT) of about 0.3 mm, its centroidal axis will be 0.15 mm from either broad side of the ribbon conductor. The centroidal axis will also be an equal distance from either edge of the ribbon. If the width (RW) of same ribbon-like conductor is about 100 mm (width measured across either broad flat side) (i.e, both flat sides of the ribbon-like conductor is about 100 mm wide across), the centroidal axis will also be about 50 mm (i.e., 100 mm/2) from either edge. The "aspect ratio" of a ribbon conductor (i.e., ribbon-shaped conductor) is the ratio of the width of the ribbon conductor to its thickness. The aspect ratio of the ribbon conductor in the example is computed as being about 300 (i.e., 100 mm/0.3 mm). The aspect ratio may be generally increased by increasing the current-carrying capacity of the foil windings by widening the conductors, and may be as small as about 100 in the case of an inexpensive 3,000 W inverter (e.g., a 12 v inverter for automobile, boat, or RV use) in accordance with embodiments of the invention. Typically, the foil conductors of the inverter may have a thickness of less than 0.5 mm. Therefore the aspect ratio can be at least 100 in many embodiments of the invention (e.g., typically in inverters rated below 5,000 W), and can be 200 or greater in embodiments of the invention rated at 5,000 W or greater, and at least 250 in embodiments of the invention rated at 10,000 W or greater than 10,000. The aspect ratio may be increased approximately linearly, or logarithmically, or exponentially with increasing power ratings (i.e, with increasing currents in the primary windings) of inverters.

The approximately uniform minimal distance between the wide surfaces (i.e., the flat sides) of the ribbon-like primary windings will typically be equal to the uniform thickness of a ribbon-like layer of dielectric (insulating) material (an insulating membrane) disposed between the surfaces of each winding. The uniform thickness of the dielectric layer should be as thin as possible without risk of mechanical or dielectric failure. Optimally, the uniform thickness of the dielectric layer will not be greater than the thickness of the ribbon conductors of the dual primary windings. Accordingly, the distance between the cross-sectional centroid of the first winding's conductor and the cross-sectional centroid of the second winding's conductor (i.e., the typical distance between the longitudinal centroidal axes of the two ribbon conductors) will typically be not greater than twice the uniform thickness of each ribbon conductor.

In embodiments of the invention, a minimally thin (e.g., less than 0.5 mm, e.g. 0.3 mm) dielectric membrane (e.g, mylar, kevlar, teflon, silicone) is disposed between minimally thin (e.g., less than 0.5 mm) conductors of the first (201-1) and second (201-2) primary windings (e.g., between conductors C6 and C5, and between conductors C3 and C4).

The physical closeness of the respective centroids of the high-aspect ratio ribbon conductors of the first (201-1) and second (201-2) primary windings throughout the inverter (200) maximizes the magnetic coupling between, and minimizes uncoupled inductance in, the current loop of the first (201-1) and second (201-2) primary windings. Uncoupled inductance in the current loops of the first and second primary windings contributes to losses and voltage spikes across the respective switches (218 and 220) during pulse-width modulated turn-off of each primary winding.

By physics, any uncoupled inductance in each primary winding is proportional to the (singly enclosed) portion of area $A_{UNCOUPLED}$ that is circumscribed by the current loop of that primary winding which is not also circumscribed by the current loop of the other primary winding. Thus, where the current carrying conductors (e.g., C6 and C5) of the primary windings are approximately parallel at a distance $D_{5-6}$, the cross-sectional area $A_{UNCOUPLED}$ can be calculated as the finite distance $D_{5-6}$ between the conductors of the first and second primary windings times the length over which that finite distance $D_{5-6}$ apart exists. This total uncoupled area $A_{UNCOUPLED}$ includes area $A_{5-6}$ between conductor C6 of the first primary (201-1) and conductor C5 of the second (201-2) primary plus area $A_{3-4}$ between conductor C4 of the first primary (201-1) and conductor C3 of the second (201-2) primary circuit. The inductance of the loop formed by the conductor(s) C1, C2, C4 C6 through the switch 218 adds to the uncoupled inductance in primary winding 201-1. Likewise, the inductance of the loop formed by the conductor(s) C1, C2, C3 and C5 through the switch 220 adds to the uncoupled inductance in primary winding 201-2.

Area $A_{5-6}$ is generally proportional to the distance $D_{5-6}$ between the centroids of conductors C5 and C6 (which is approximately equal to the thickness of a dielectric membrane disposed between them plus the thickness of one such conductor). Accordingly, the thickness of the conductors C6 and C5 and the thickness of a dielectric membrane (not shown) disposed between them is to be minimized. A component of Area $A_{5-6}$ is proportional to the length $L_{SPAN}$ of the segment of conductors C5 and C6 between the transformer 216 and switch block 230 (containing switches 218 and 220). Accordingly, the length $L_{SPAN}$ of that segment is to be minimized (as is depicted in FIGS. 7A1).

The total area $A_{UNCOUPLED}$ further includes area $A_{3-4}$ between conductor C4 of the first primary (201-1) and conductor C3 of the second (201-2) primary. Area $A_{3-4}$ is generally proportional to the distance $D_{3-4}$ between the centroids of conductors C3 and C4 (which is approximately equal to the thickness of the dielectric membrane disposed between them plus the thickness of one such conductor). Accordingly, the thickness of the conductors C3 and C4 (which may be the same conductive ribbon as C5 and C6) and the thickness of a dielectric membrane (not shown) disposed between them is to be minimized. A component of Area $A_{3-4}$ is proportional to the length $L_{SPAN}$ of the segment of conductors C3 and C4 between the transformer 216 and switch block 230. (The switch block 230 is the region or regions of the inverter or of circuit boards 245 therein containing switches, such as composite switch 218 (comprising switching devices 218-1 and 218-2) and composite switch 220 (comprising switching devices 220-1 and 220-2)) Accordingly, the length $L_{SPAN}$ of that segment should be minimized (as is depicted in FIG. 2D and as is shown further minimized in FIG. 7A1).

The total uncoupled inductance of each primary winding further includes the inductance due to the small current loop of conductors within the switch block(s) 230. Accordingly, current paths (i.e., loops) within each switch 218 and 220 should be effectively minimized. Embodiments of the invention provide a compact heat sink (see discussion of FIGS. 5A–5C) and a compact high-current carrying semiconductor switch mounting and cooling assembly (see discussion of FIGS. 4Ai–4Aiii) used to implement compact switching circuit loops within each of the two primary winding circuits.

The two switches (218 and 220) are controlled by two alternating sinusoidally modulated PWM signals having a high fundamental frequency (e.g. greater than 10 kHz, such as for example 28 kHz). Thus, the switching frequency of half-bridge embodiments of the inverter operates at high power and well beyond the "1 kHz" difficulty threshold noted in the academic literature quoted above. As is understood by persons skilled in the art, the Modulation Index of the PWM signal and other parameters may be set such that both switches will not be on simultaneously (i.e., to avoid short circuiting switches (218 and 220)). Dead time may be thus purposely inserted using the duty ratio of the PWM control waveform asserted at the gate(s) of each switch.

Figure 2B:
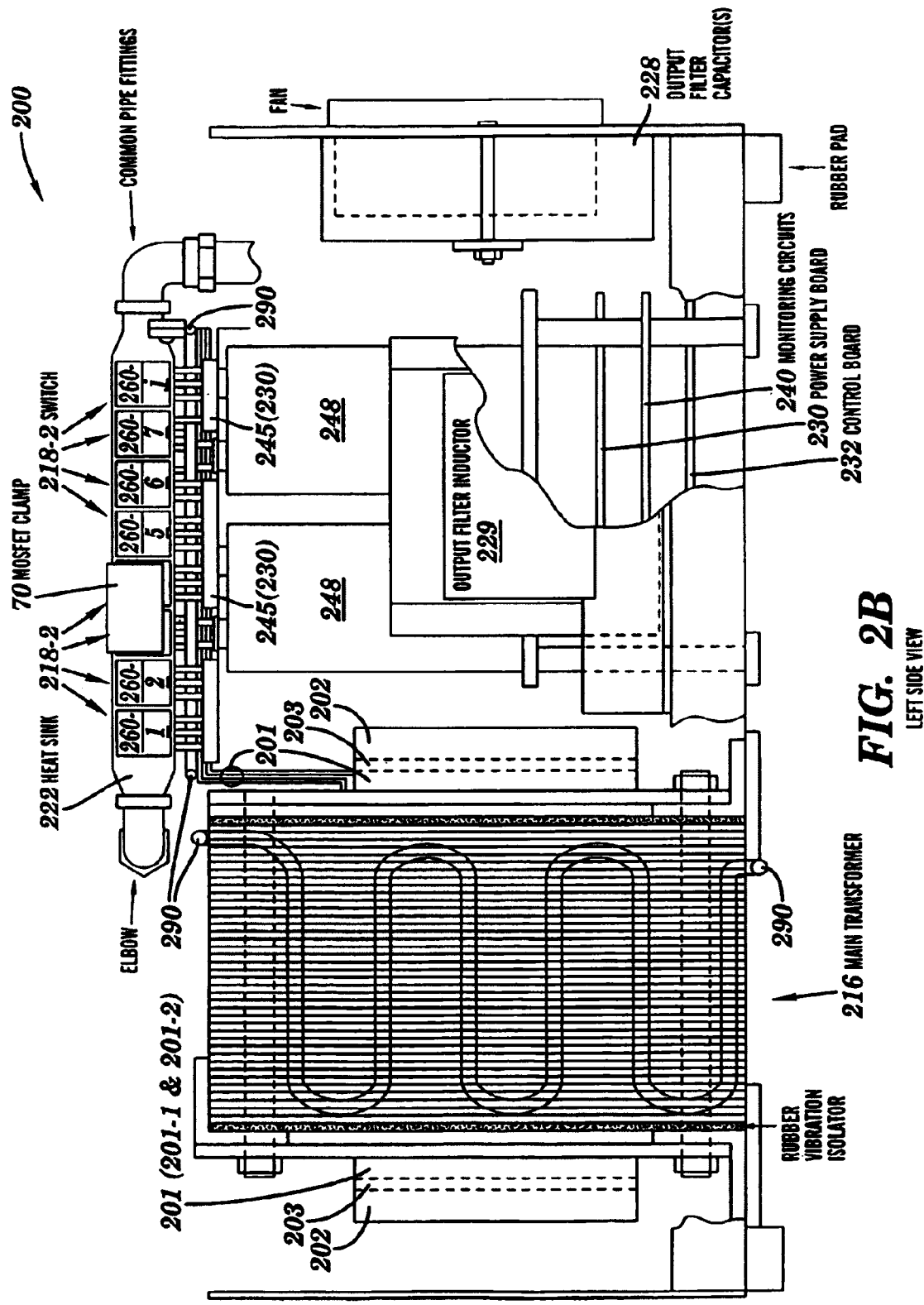
FIG. 2B depicts a left side view of 10,000 W inverter that is a physical embodiment of the inverter circuit design of FIG. 2A in accordance with embodiments of the present invention.
Figure 2C:
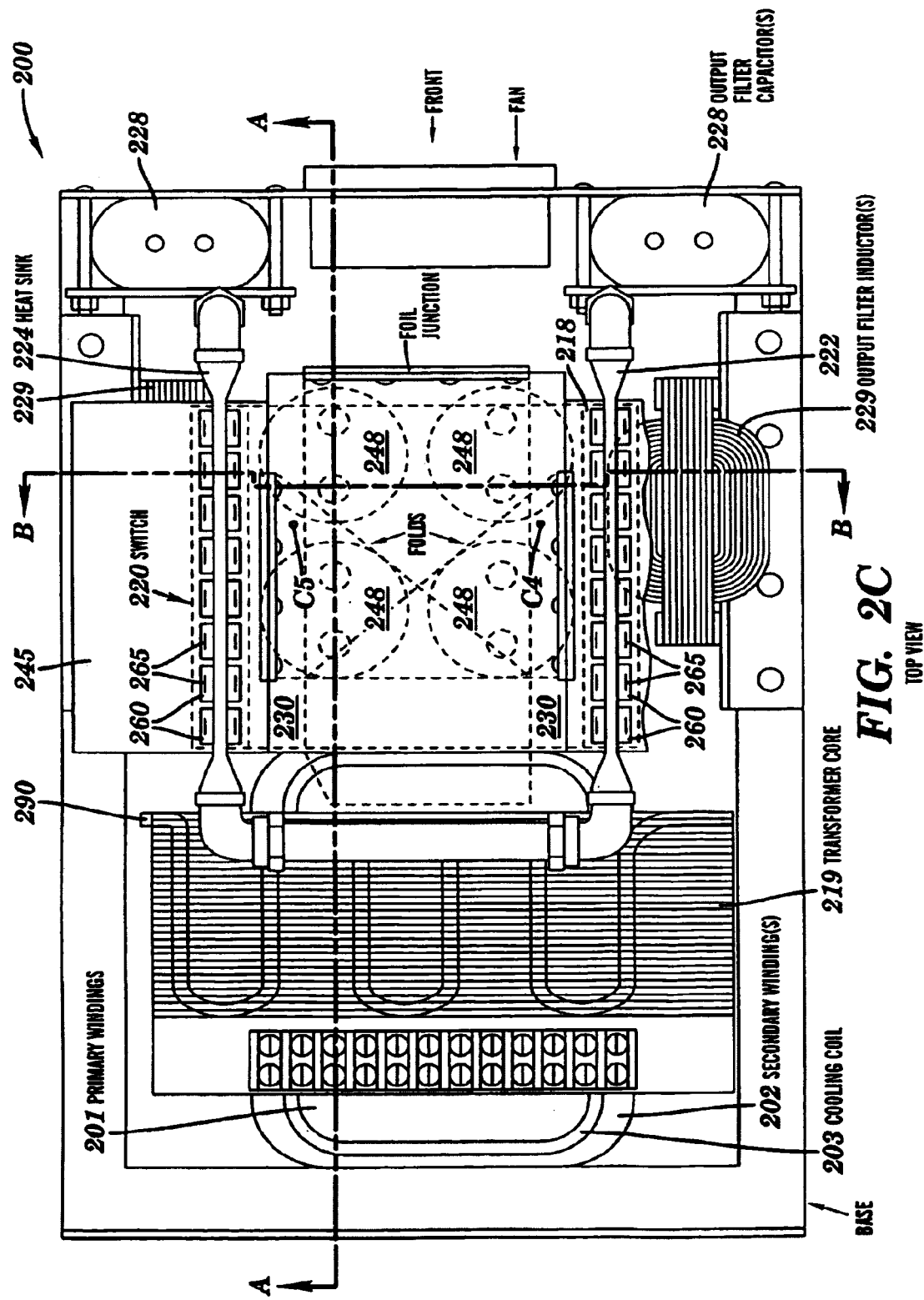
FIG. 2C depicts a top view of the inverter of FIG. 2B.
Figure 2D:
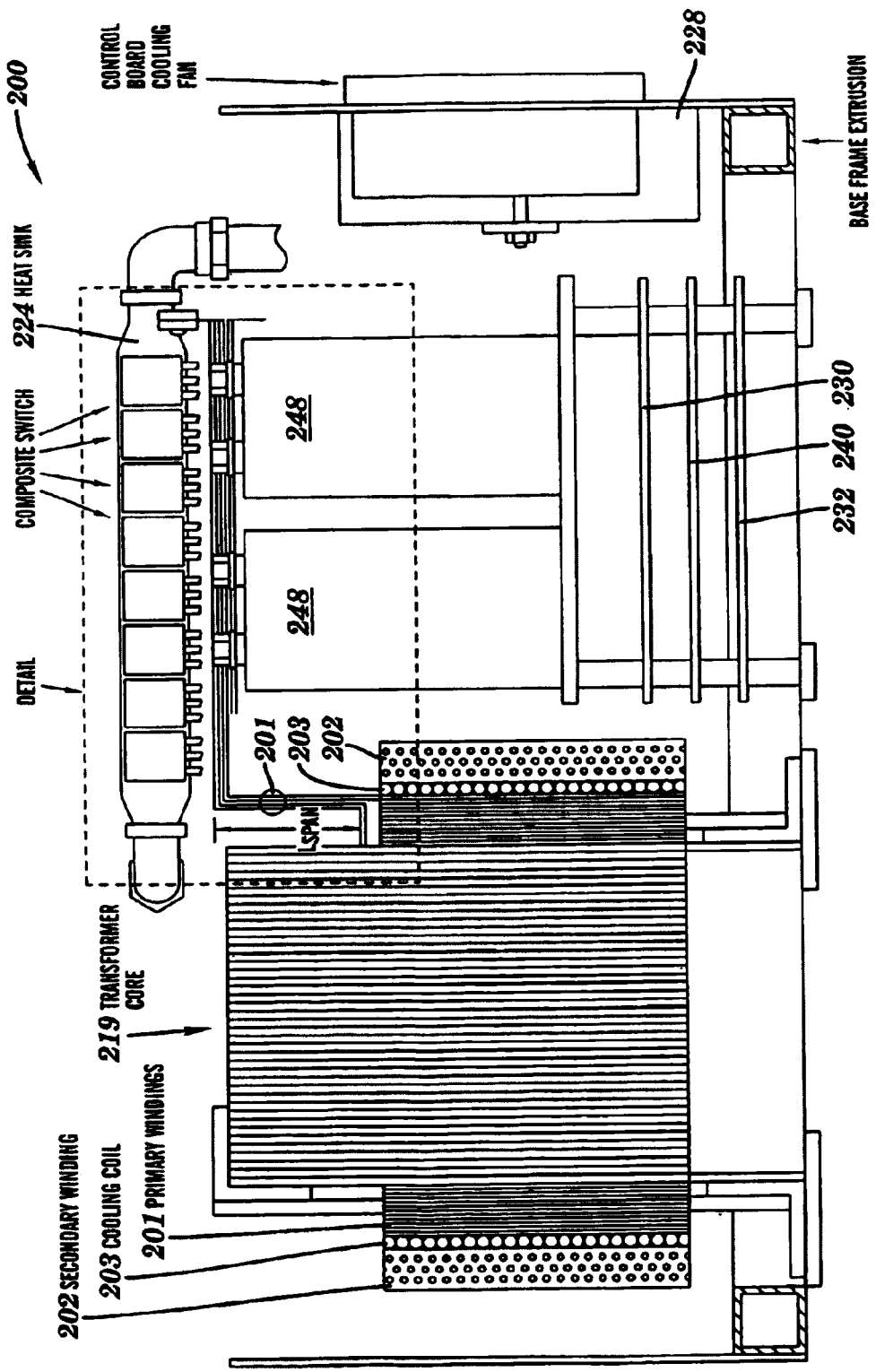
FIG. 2D depicts a cross-sectional view, from a left side perspective, of the inverter of FIGS. 2B and 2C.

FIGS. 2B, 2C and 2D depict left-side, top, and cross-sectional views of a functioning prototype of inverter (200) constructed in accordance with embodiments of the invention. The inverter (200) of FIGS. 2B–2D has been built and was continuously operated at steady state at switching frequencies over 5 KHz (e.g., 10 kHz, 14 kHz, and 28 kHz), while outputting 10,000 W of power through a resistive load as a filtered pure 60 Hz sine-wave AC current, without failure. The prototype inverter rated at 10,000 W had a DC-to-AC power conversion efficiency greater than 80 percent when operated at switching frequencies above the human audible range (e.g., 28 kHz), and typically operated at power conversion efficiencies greater than 95% at switching frequencies within the human audible range. An enclosure (e.g., a metal box having electrical and plumbing ports) fitted to compactly enclose the 10,000 W rated inverter built in accordance with the features of inverter (200) of FIG. 2A, has the following external dimensions: Height approx. 10 inches; Width approx. 14 inches; Depth approx. 16 inches. Accordingly, a 10,000 W inverter (200) constructed in accordance with embodiments of the invention may be enclosed within a volume of 2240 cubic inches or less, and have a continuous AC power density of at least about 4.0 (e.g., 4.46) Watts per cubic inch.

Through further minimization (i.e., shortening) of primary winding current paths (such as by reducing $L_{SPAN}$ as depicted in FIG. 7A1) and by minimization of underutilized space within the prototype inverter's enclosure, the dimensions of the enclosure of a 10,000 W-plus inverter having the performance and design features of inverter (200) of FIG. 2A can be reduced further (i.e. so as to have an enclosure volume substantially less than 2240 cubic inches). AC Power density is measured by the continuous AC power output (i.e., rated power output) of the inverter divided by the volume (e.g., cubic inches) of a box-shaped (i.e., six sided having 3 principal exterior dimensions: width, height, length/depth) enclosure that will enclose the components (including the transformer, power capacitors, switches, filter inductors and filter capacitors, heat-sinks and control circuitry) and subsystems needed for operation of the inverter at the rated power output (Watts).

Embodiments of the inverter (200) are scalable and expandable to provide continuous pure sine-wave output at any large AC power output level greater than 3,000 watts, and at AC power-densities equal to or greater than 4 Watts per cubic inch (e.g., 5.0, 6.0, 7.0 or more Watts per cubic inch). Because all the heat-releasing elements of the inverter (e.g., transformer, foil conductors, switches, capacitors, etc. can be fluid-cooled (e.g., with serpentine cooling pipes inside or affixed to their surfaces), any air-space within the enclosure of the inverter can be minimized or eliminated entirely in order to further increase the power-density of the inverter. The maximum power density of the inverter therefore is limited only by the volume of the solid components within the enclosure, such as the power transformer, the DC capacitors, fluid conduits, control circuits (each of which may be reduced to a single IC), output filter capacitors etc. Because a 60 Hz power transformer is typically the largest power-transforming component within the inverter, the power-density of the inverter can approach but not exceed the power density of the transformer itself and will be limited thereby. Variations of transformer geometry and of transformer core materials can optimize (i.e., increase) the power density of the transformer and therefore of the inverter, (with a probable increase in costs of materials etc). In a 10,000 W-rated prototype of the inverter, the transformer-to-inverter volume ratio (TIVR, i.e., the ratio of the volume of the power transformer to the volume of the entire inverter) was estimated at approximately 50%, resulting in a power density of the inverter (i.e., about 4.46 watts per cubic inch) being approximately equal to 50% of the output-power density of the power transformer (i.e., about 9.0 watts per cubic inch). In some compact embodiments of the invention such as wherein the TIVR is increased to 80% (e.g., the volume of components inside the enclosure other than the power transformer are reduced to between 10% to 15% of the volume of the transformer) the power density of the inverter may be equal to up to eighty percent of the power density of the power transformer (e.g., 7.2 Watts per cubic inch).

Logically, the performance of the inverter (200) may be easily reduced and diluted by persons skilled in the art so to obtain any lesser AC power output level (e.g., any power level less-than 3,000 W, or less than 10,000 W) and/or any lesser AC power density less than 4.46 (e.g., 4.0, 3.0, 2.0, 1.0 or less) Watts per cubic inch, while practicing the teachings of the invention.

The inverter (200) of FIGS. 2A–2D comprises dual (i.e., bifilar) primary windings (201-1 and 201-2) wound generally coaxially around a transformer core 219 (e.g., around the center leg of a three-leg transformer core). Each primary winding (201-1, 201-2) may composed of a very thin wide (e.g., foil, tape-like, ribbon-like) solid conductor, (alternatively, the two primary windings may be formed of litz-wire, which also may be formed to have an approximately ribbon-shape, e.g., rectangular, cross-section). Each primary winding shall have sufficient conducting cross-sectional area to carry sufficient current to power the inverter at its rated output. Ribbon-like conductors used as the conductors of the primary windings should have a high aspect ratio, e.g., greater than 200 (e.g., 250, 300, 400 or more).

With Litz wire, it is possible to minimize uncoupled inductance by connecting every second alternating strand in parallel to form one winding, and connecting the remainder of the strands to form the second winding. Together, the two parallel primary windings form a litz-wire dual primary winding that is wound around the transformer's core. A wire strand of each winding may be adjacent to one or more strands of the other winding within the longitudinal segment of each winding that is wound around the transformer core. In some embodiments, each wire strand of the first primary winding may be twisted together with a wire strand of the second primary winding to form a conventional "twisted pair". Alternatively, every wire strand of the wire strand of the first primary winding may be substantially parallel with the wire strands of the second primary winding to form the dual primary winding, the entire dual primary winding being twisted as one unit such that a first plurality of parallel wire conductors (the first primary winding) and a second plurality of parallel wire conductors (the second primary winding) are twisted together other. A Litz-wire dual primary winding may be shaped (e.g., by pressing) so that it takes the form of a rectangular or flat primary winding (e.g., the cross-sectional perimeter will have an approximately rectangular perimeter), that may be convenient to wind around the core of the transformer.

The width of a primary winding's ribbon-shaped conductor may be increased (e.g., scaled up in proportion to increased power output) without limitation (provided that the transformer shape is adjusted accordingly, or the ribbons of two windings are folded bifilarly together fit the transformer), to accommodate larger currents and larger rated-power outputs. However, the thin ribbon-thickness (RT) dimension of each foil primary conductor should be minimized (e.g., made less than 0.5 mm) and the thickness of the insulating layer (not shown) between the ribbon-like conductors minimized in order to keep the cross-sectional centroid of each primary winding as close as possible to the cross-sectional centroid of the other (adjacent) primary winding. This is done to maximize magnetic coupling between the first primary winding 201-1 and the adjacent second primary winding 201-2.

The bifilar-wound dual primary windings within the transformer 216 may be formed by stacking a first very thin dielectric (i.e., insulating) membrane upon the first primary ribbon-shaped conductor, and stacking the second primary ribbon-shaped conductor upon that first membrane, and then stacking a second very thin dielectric (i.e., insulating) membrane upon the second primary ribbon-shaped conductor, a then carefully rolling the stack up tightly around a transformer core 219, as will be understood and carried out routinely by persons skilled in the art of transformer construction.

The length $L_{SPAN}$ of portions of the primary winding conductors (C6, C5, C4 and C3) between the transformer 216 and the switch block(s) 230 (containing the switches 218 and 220) is minimized first by providing a printed circuit board 245 whereon each of the switches 218 and 220 (which are connected to conductors C4 and C5 respectively) is mounted in immediate physical proximity to the isoelectric (e.g., centertapped) ribbon-shaped conductors C6 and C1. As used herein, "isoelectric" means elements, wires or conductors expected to have equal electric potential (i.e., voltage), such as due to electrically conductive contact between them. The length $L_{SPAN}$ is further reduced by moving the printed circuit board 245 closer to the transformer, as shown in FIGS. 7A1 and 7A2. The length of the windings (and hence the magnitude of each winding's uncoupled inductance) may be further reduced by employing the arrangement of transformer-to-circuit board depicted in FIG. 7A4.

Transformer Cooling

When liquid cooling of the power transformer 216 is desirable, a coil of thermally conductive tubing (e.g., copper or aluminum tubing) 203 can be wound around the transformer 216 core 219 (e.g., outside the primary coils 201) as depicted in FIG. 2B. The cooling coil 203 will be connected to an external coolant liquid circulating system, (e.g., to an inlet or an outlet of the heat fluid-carrying heat sink 222 shown in FIG. 2B).

The cooling coil 203 may be used as an output (secondary) coil of the transformer 216. For this purpose, metal tubing of this cooling coil 203 may be coated with insulating material, so as to function as a coil of hollow insulated wire. In certain circumstances, the tube (e.g., if composed of copper or aluminum) may function as the AC-output secondary coil (e.g., 202). Alternatively, the cooling coil 203 may be used as a voltage sensor in an inverter monitoring circuit 240 (e.g., a feedback control system). Alternatively, it can be used as a power source for system auxiliaries such as a battery charger, if one is needed in an overall system of which the inverter constitutes a subsystem.

Additionally, or alternatively, any surface within the inverter (e.g., any or all of the flat sides of the transformer 216 and/or the broad surfaces of the flat primary conductors 201 external to the transformer 216) can be cooled by a fluid-cooled heat-sink, such as by applying to each such surface a serpentine fluid-carrying cooling tube 290 as is depicted in FIGS. 2B and 2C. The serpentine cooling tube 290 may be adhered to a surface to be cooled by the simple application of a bead of thermally conductive adhesive (e.g, epoxy) between the serpentine cooling tube and the surface to be cooled, and pressingly applying the serpentine cooling tube 290 to the surface. Each serpentine cooling tube 290 may be connected in series, or in parallel with fluid conduits of other fluid-cooled structures within the inverter.

Driver Circuit Board

Figure 3A:
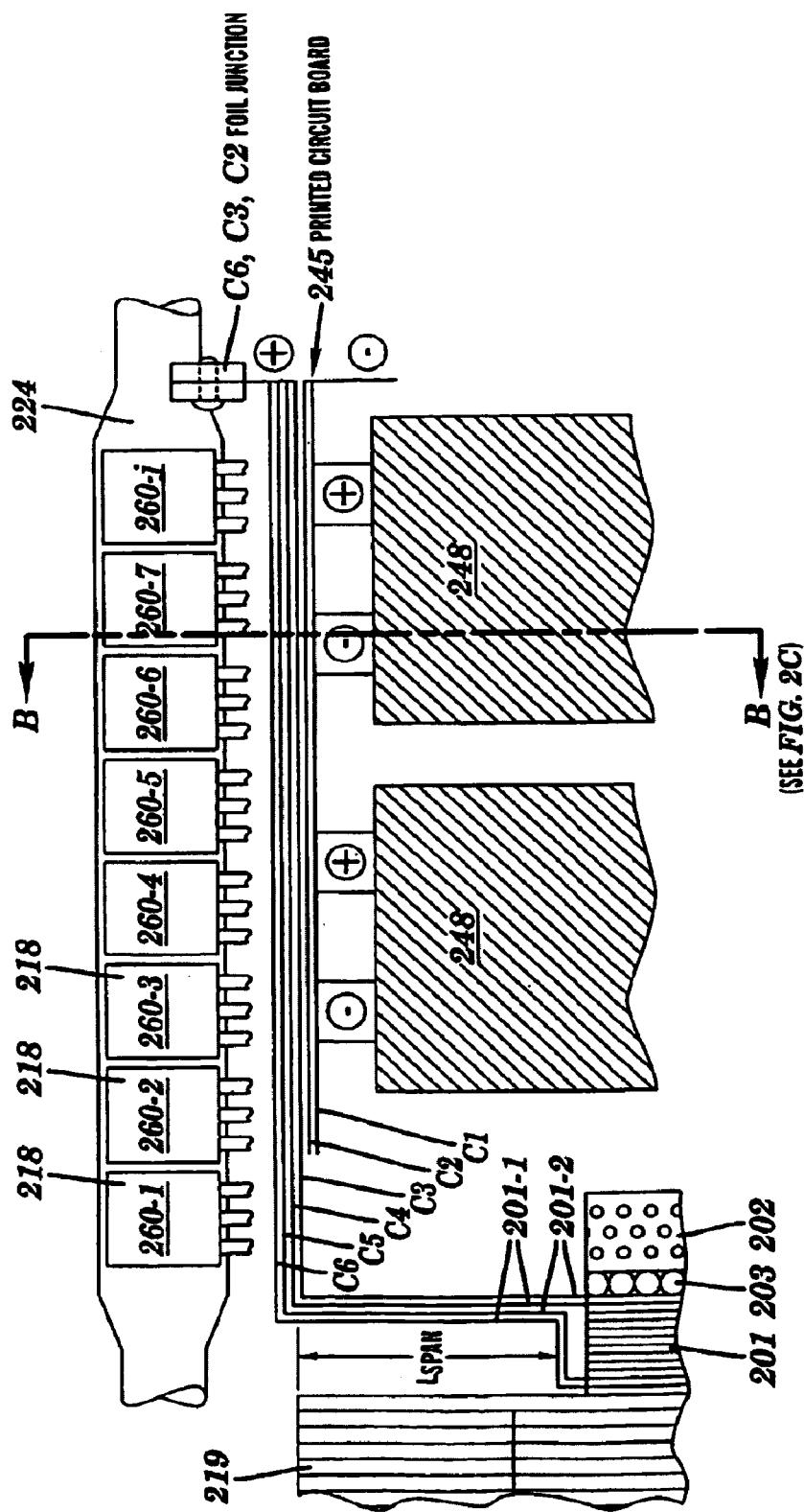
FIG. 3A depicts a cross-sectional view, from a left side perspective, of a portion of the inverter of FIG. 2C within the detail area delineated in FIG. 2D.

FIGS. 3A and 3B depict cross-sectional views (from a left side and front end perspectives, respectively) of a portion of the inverter (200) of FIGS. 2B–2D, within the detail area delineated in FIG. 2D, including two symmetrical driver circuit board portions 245-R and 245-L. Foil conductors C1, C2, C3, C4, C5, and C6 are stacked as shown in FIGS. 3A and 3B in order to minimize uncoupled inductance between primary windings 201-1 and 201-2, as above explained, and to minimize resistive losses in the switch-winding circuits. Dielectric (i.e., insulating) materials (not shown) are disposed between each adjacent pair of stacked conductors among C1, C2, C3, C4, C5, and C6, so that each conductor may perform its intended electrical function.

Conductors C1 and C2, and C4 and C5 may be integrated with or soldered onto one or more printed circuit boards 245 (e.g., 245-R and 245-L) that carry the switches 218 and 220. Foil junctions (e.g., clamps) in conductors C4 and C5 are optionally provided to facilitate assembly and disassembly of the foil conductor stacks (e.g., for separation and removal of the transformer 216). The high-current conducting foils of conductors C1, C2, C4, and C5 facilitate very short high-current circuits paths through the switches 218 and 220 which reduces uncoupled inductances within the primary windings 201-1 and 201-2 as aforesaid.

Each switch (218 and 220) (see FIG. 2A) may be implemented as a composite switch comprising a plurality j of packaged semiconductor switches 260 (e.g., 260-1 through 260-j), each package 260 containing a semiconductor switching device 265 (e.g., metal oxide field effect transistors (MOSFET), or insulated-gate bipolar transistors (IGBT)), operating in parallel and cooled by being coupled directly to a linear heat sink (222 or 224). If each heat sink (e.g., 222) has two opposing flat sides, as do the heat sinks shown in FIG. 3B, then two rows of parallel packaged semiconductor switches (e.g., 218-1 and 218-2) may be densely mounted and connected in parallel to form each of the composite switches (e.g., 218). The plurality of parallel mounted packaged semiconductor switches 260-1 though 260-j on each side of each heat sink (222 or 224) dissipate heat more diffusely than a single large semiconductor switch would, and also facilitate replacement of inexpensive switches rather than single large expensive switches.

FIGS. 4Ai, 4Aii, and 4A-iii depict cross-sectional, top-copper, and top view of bottom-copper views of an inventive high-current circuit board 245 (e.g., either 245-R or 245-L) having thick (e.g., $T_F$ greater than 1 mm) patterned copper foil layers for very short high-current circuits paths to and through the packaged semiconductors 260 (e.g, switches 218 and 220) which in embodiments of the inverter (200) reduce uncoupled inductances within each of the two primary windings 201-1 and 201-2 as aforesaid.

FIG. 4Ai depicts the cross-sections of j thick (e.g., $T_{F1}$ greater than 1 mm) copper tongues extending conductors C4 (or C5) directly to the j drains of the nearest j packaged semiconductor switches (260-1 through 260-j). FIG. 4Aii shows a top view of these j copper tongues of conductor C4 (or C5), with the j packaged semiconductor switches drawn transparently, and the heat sink 218 (or 222) removed for purposes of illustration. FIG. 4Aii also shows the Gate Bus used to distribute the PWM switch-control signal simultaneously to the 2j gates of all the 2j semiconductor switches 260 (e.g., through a plurality 2j of resistors provided to prevent auto-excitation).

FIG. 4Aiii shows a see-though top perspective view of the patterned bottom copper layer of the circuit board 245. The patterned bottom copper includes: thick (e.g., $T_{F1}$ greater than 1 mm) copper foil drain links to extend a conductor C4 (or C5) from the drain of the nearest, to the drain of the farthest packaged switch 260; thick copper foil gate links, to distribute the PWM switch-controls from the gate bus (see FIG. 4Aii) to the gate of every packaged switch 260; the thick (e.g., $T_{F2}$ greater than 1 mm) copper foil of conductor C1 including copper tongues which extend directly to the 2j drains of the 2j packaged semiconductor switches (260-1 through 260-j on each side of heat sink 218 or 220). These thick-foil patterns are only examples, and persons skilled in the art could vary the arrangement of stacked conductors C1, C2, C3, C4, C5 and C6 and the patterns thereof (See variations in FIGS. 7A1, 7B1, 7A2, 7B2, 7C1, 7C2) without departing from teachings of the disclosed invention. The within figures merely illustrate and example of foil patterns for densely mounting multiple semiconductor switch packages 260 for parallel operation to form a single composite switch (e.g., 218 or 220).

FIGS. 4Bi, 4Bii and 4Biii depict cross-sections along drain-to-drain, source-to-source and gate-to gate links, to illustrate the inventive cooperative relationship between the linear heatsink (e.g., 222) and the composite switch (218), and the high-current carrying patterned thick copper foil (e.g., tongues and links) on circuit board 245-R. This cooperative relationship facilitates the routing and switching of very high currents (many hundreds of amps, e.g. over 200 amps and over 300 amps) within a minimal footprint area on a circuit board 245 (i.e., a minimal portion of a printed circuit board), which minimizes the current loop and uncoupled inductance for each primary winding within the switch block(s) (230 as delineated in FIG. 2A). The patterned copper foil layers should be thick enough to carry high currents (e.g., on the order of tens of amperes (e.g., 50 Amps), such as by use of 45 mil to 2 mm thick copper foil) to each semiconductor switch. Each tongue or trace should be at least as large in cross-section as the leads of each of the semiconductor device connected thereto. The thick patterned foils may be machined into shape and applied to the printed circuit board by conductive adhesive and/or solder.

Heat Sink

A further aspect of the invention provides an inventive linear heat-sink and a compact parallel semiconductor mounting arrangement for forming a cooled composite semiconductor circuit (comprising a plurality of semiconductor devices connected in parallel) which is simple and economical to manufacture and assemble. The inventive cooling apparatus may be generally characterized by a linear heatsink having an interior fluid carrying conduit and at least one (e.g., two) exterior flat side for abutting with a plurality of heat-generating elements (e.g., TO-247 packaged semiconductor switches) aligned in a row and mounted on a printed circuit board. The cooling apparatus may include a metal cooling fluid-carrying conduit having two opposing flat sides, each flat side being in abutting contact with a plurality of heat-generating elements aligned in a row and mounted on a printed circuit board. Thus, the fluid conduit will be disposed between two parallel rows of heat-generating elements (e.g., as heat sink 222 and 224 are shown in the top-perspective view of FIG. 2C cooling the rows of semiconductor switches pertaining to composite switches 218 and 220 respectively).

An embodiment of the inventive cooling apparatus (i.e., an apparatus for cooling a packaged or unpackaged semiconductor) comprises a length of metal conduit having one or more (e.g., two) substantially flat exterior surfaces, such as substantially parallel flat surfaces. Each flat surface of the inventive cooling apparatus is adapted to cool a plurality of abutting integrated circuit chip packages or any other heat generating components also having a flat surface. A cooled assembly including the inventive cooling apparatus can have a minimum footprint on a circuit board, and a minimum volume in an enclosure, and a minimum number of simple parts.

FIG. 5A is a side-perspective view FIG. 5B is a top-perspective view and FIG. 5C is a cross-sectional end-perspective view of an embodiment of the inventive cooling apparatus 510 employed within an inventive cooled assembly 500 to cool a plurality of semiconductor chip packages 560. The chip packages 560 are held in abutting contact with flat surfaces (512-1 and 512-2) of the cooling apparatus 510 by a plurality of springs clips, specifically, binder clips 570 whose handles have been optionally removed as shown. Screw-tightened "C-clamps" and many other known clamping devices may be substituted for the binder clip springs in the inventive assembly 500.

Embodiments of the cooling apparatus (e.g., 510) comprise a copper fluid conduit having a contact segment 511 that has two opposing flat surfaces 512 (e.g., 512-1 and 512-2) and optionally further comprising an inlet portion 520-IN and an outlet portion 520-OUT. Each flat surface 512 in contact segment 511 of the cooling apparatus 510 shall have sufficient length (L) to accommodate therealong a predetermined number (e.g., a plurality j) of discrete packaged semiconductors 565 (e.g., semiconductor chips 565, such as packaged semiconductor switches 265 within semiconductor packages 260-1 through 260-j of FIG. 2B et seq.), and one or several independently-acting spring clamps 570 holding such packaged semiconductors 565 against the flat surfaces 512. (Either end portion 520 of the conduit may function as the inlet portion 520-IN or as the outlet portion 520-OUT, depending upon the direction of flow of a cooling fluid 540 being forced through the conduit). Each end portion 520 (e.g., inlet portion 520-IN and outlet portion 520-OUT) may include a cylindrical segment 522, such as an inlet cylinder 522-IN and an outlet cylinder 522-OUT. Each cylinder segment 522 may have the same diameter D and round circumference (or they could each be of different shapes and/or diameters). In some embodiments each end portion 520 may comprise a flat-sided segment having the same cross-sectional shape as the contact segment 511.

Both the inlet portion 520-IN and the outlet portion 520-OUT and the contact segment 511 thereinbetween may be formed from the same fluid conduit, such as a round copper pipe having approximately uniform wall thickness T and approximately uniform diameter D and approximately uniform circumference C. The wall-thickness need not be uniform outside of the side areas of the fluid carrying conduit that shall be made into the flat sides of the heat sink. Thus, inexpensive round copper pipes with "seams" or other longitudinal imperfections formed inside or outside may be used to form the contact segment 511 of the cooling apparatus 510.

The apparatus 510 may have rotational symmetry about a longitudinal axis 505 (running from end to end through the centroid of the cross-section of the fluid carrying channel within the contact segment) and also rotational symmetry about an axis perpendicular to the plane of one of the flat sides 512. The apparatus 510 may have bilateral symmetry about a plane that is between two opposite flat sides 512 of the apparatus 510, as in the embodiment shown in FIGS. 5A, 5B, and 5C. The two flat sides 512 need not be in planes perfectly parallel to each other. Accordingly, the cross-sectional of the apparatus 510 within the contact segment 511 may have an approximately trapezoidal cross-sectional shape.

Each finite segment (e.g., 522-IN, 511, 522-OUT) of the inventive cooling apparatus 510 may have an approximately equal circumference C, as measured around the outside perimeter of cross sections along the longitudinal axis 505 of the apparatus. In particular, the circumference (i.e, the perimeter P of a cross-section perpendicular to the axis 505) $C_{CONTACT}$ of the flattened contact segment 511 will be approximately equal to the round circumference $C_{INLET}$ of the inlet cylinder 522-IN and approximately equal to the round circumference $C_{OUTLET}$ of the outlet cylinder 522-OUT. In many embodiments, the circumferences $C_{INLET}$ and $C_{OUTLET}$ of the inlet cylinder 522-IN and the outlet cylinder 522-OUT will be about equal to the round circumference C of a round pipe out of which the apparatus 510 has been formed.

In alternative embodiments the cooling apparatus 510 may be truncated at one or both ends, such that part or all of each of the inlet portion 520-IN and the outlet portion 520-OUT are omitted. For example, the cooling apparatus 510 may consist essentially of the flat sided contact segment 511, and the circumference $C_{CONTACT}$ of the flattened contact segment 511 will be approximately equal to the circumference C of a round pipe out of which the contact segment 511 was formed.

In various embodiments, each of two opposite flattened sides (e.g., 512-1, 512-2) of the inventive cooling apparatus 510 will have approximately equal height H (e.g, the height of first flat side H1 equals H and the height of the second flat side H2 equals H), which may be equal to or less than the total height TH of the contact segment 511 of the conduit. The height H of each flat surface 512 of the cooling apparatus 510 will preferably be at least as high as the corresponding device height dimension (HD) of a surface of a device (e.g., a chip 565 or chip package 560) that is to be cooled, thus obviating the need to provide any additional heat-distributing block or pad between the conduit 510 and the chip to be cooled. The height H may be less than, equal to, or greater than the outside diameter D of the pipe out of which the apparatus may be formed (e.g., D equals the outside diameter of the inlet cylinder 522-IN and D equals the diameter of the outlet cylinder 522-OUT). In embodiments found to be highly compact and efficient, the height H of each flattened side is equal to or greater than diameter D. Accordingly, since D= $C/\pi$ in such compact embodiments, the height H will be approximately equal to or greater than $C/\pi$ (i.e., C/3.14). In compact specimen of the cooling apparatus 510 that operate well to continuously (i.e., perpetually, continuing for an indefinitely long time) cool each of two banks of packaged semiconductor switches in chip packages 560 in a 10,000 W rated true sine-wave inverter powering a 10,000 watt resistive load: the height H of the (each of the two) contact segments 511 are approximately 18.75 mm; and the diameter D of the pipes and of the inlet cylinders and outlet cylinders 522 are approximately 16.0 mm (i.e, about 0.5 inches for nominally "½ inch pipe"); and the wall thickness is approximately 0.8 mm, and the width W (i.e., distance between flat sides 512-1 and 512-2) is between about 3.5 mm and 5.5 mm (e.g., 5.0 mm), and the length of the contact segment is between 14.0 cm and approximately 17.0 cm; and the total height TH of the contact segment 511 is approximately 21.0 mm to approximately 22.5 mm; and length X of each transition portion (523-OUT and 523-IN)) can be between 12 mm and 20 mm. The length X of the transition portion can be minimized (e.g., kept less than about 130% of the diameter of the pipe) by providing a cylindrical support inside of the transition portion during formation of the contact portion.

In various embodiments, each of the heights H1 and H2 are equal to or greater than the diameter D of a pipe having circumference P, e.g., about 115% of D. A transition portion abutting the contact segment may have a length that is less than about 130% of the diameter D of the cylindrical pipe having circumference P.

In use, a flat surface 512 of the cooling apparatus 510 will be coupled to at least one heat-generating device (e.g., a chip package 560) to form a temperature-controlled assembly 500. The heat-generating device may be semiconductor chip package 560 (e.g., a TO-220, TO-247, or other flat-back chip packages) containing a semiconductor chip 565. The chip package 560 contains at least one semiconductor chip 565 or any other heat-releasing electronic or electrical element. The chip package 560 may have the form selected from the many conventional packaging structures that have a flat heat-dissipating external surface. The chip package 560 may consist essentially of a semiconductor chip 565 having wire leads (e.g., 531, 532, 533) wherein the semiconductor chip 565 is conformally coated with a layer of thermally conductive material (e.g. epoxy) formed to have a flat external surface.

The assembly 500 and its active (heat-generating) components (e.g., Power FET switch on a semiconductor chip 565) may be held near to the temperature of the cooling fluid 540 flowing within the cooling conduit 510, by mounting the chip package 560 close to a flat surface 512 of the cooling conduit 510. The shorter the distance between each heat-generating component (e.g., a Field Effect Transistor switch on the semiconductor chip 560) and a flat surface 512 of the cooling apparatus 510, the cooler (i.e., at a lower temperature near to the temperature of the fluid coolant 540) the heat-generating components can be maintained by using a fluid coolant 540 of a given temperature.

In some embodiments of the invention, a semiconductor chip 565 may be in direct physical contact with a flat surface 512 of the cooling conduit 510. In other embodiments of the invention, (as shown in FIGS. 5A, 5B, and 5C) one or more layers of thermally conductive material 566 may be disposed between the semiconductor chip 565 and the flat surface 512 of the cooling conduit 510. The thermally conductive material 566 may be either electrically conductive or electrically nonconductive. The thermally conductive material 566 may include a heat conductive epoxy, ceramic, metal etc. The semiconductor chip (e.g., including a Power FET switch) may be packaged in any conventional packaging structure having a flat surface that may be mounted upon the flat surfaces 512 of the cooling apparatus 510.

A chip package 560 may be joined to the cooling apparatus 510 in several ways. One method is bonding with the use of a heat conductive epoxy adhesive. Additionally, to maximize thermal conduction by application of pressure, or alternatively, (for purposes of facilitating easy removal and replacement of the chip package 560) a chip package can be mounted by a clamping device that applies a constant force such as commercially available binder clip springs 570 as shown installed in FIGS. 5A, 5B, and 5C.

The compact and linear nature of the inventive cooling apparatus 510 facilitates the cooling of chip packages while they are mounted directly on a printed circuit board 580 as depicted in FIG. 5C. A plurality of low-power rated semiconductor devices 560 operating in parallel can be cooled by one apparatus 510 while mounted in close proximity to each other along two parallel lines (i.e., one on each side of the cooling apparatus 510) on the printed circuit board 580. Thus, a fluid-cooled assembly 500 may include a cooling apparatus 510, a plurality of electronic devices (e.g. 560) and a printed circuit board 580. The compact nature and vertical orientation of this assembly 580 can maximize the density of high-power circuits that include heat-dissipating devices, such as semiconductor switches in high power inverters. The linear and vertically oriented nature of the fluid-cooled chip packages 560 in the assembly 500 also facilitates the manufacture (e.g., robotic construction) of such circuit board-based assemblies 500, as well as subsequent repair and replacement of individual chip packages 560.

The compact nature of the cooled assembly 500 including a plurality of chip packages 560 and a circuit board 580 allows for heavier currents to be carried in shorter current paths through devices in the chip packages 560. This reduction in current path length in turn reduces resistance and resistive losses. The reduced current path also reduces circuit loop inductance, facilitating meeting very close timing requirements of high frequency circuits (such as PWM signals in high frequency inverters).

Although the inventive fluid-cooled assembly 500 is shown comprising a metal cooling conduit 560 having one or more (e.g., two) substantially flat exterior surfaces 512, the cooling apparatus 510 may have one, two, three or four or more such flat surfaces 512 in accordance with alternative embodiments of the invention. A cooling apparatus having four such flat surfaces 512 in accordance with embodiments of the invention may have a substantially rectangular cross-section with rounded or chamferred corners.

Method for Forming the Heatsink from a Round Copper Pipe

FIG. 6, depicts, among other things, a round pipe 610 having diameter D and circumference C out which the shaped heatsink 510 of FIGS. 5A–5C can be formed. Flattened surface(s) 512 (e.g., 512-1 and 512-2) within the contact segment 511 of the heat sink 510 may generally be formed out of the round pipe by flattening two opposite sides of the pipe 610 within an intended contact segment 511 of the future heatsink 510. Flattening may be attempted by placing that segment of the pipe 610 between the smooth flat jaws of a vice (e.g., a clamping device of metal or wood, comprising two flat jaws closed or opened by a screw or lever, as is commonly used in carpentry or metalworking to hold a piece in position.) However, experience teaches that such a simple method will typically fail to produce sufficiently flat surfaces 512, due to forces and/or torques that develop in the non-flattened portions of the pipe during compression. Bumps and/or concavities or other irregularities in the flattened surfaces 512 in the contact segment 511 result in incomplete physical contact of abutting chip packages 560 (see FIG. 5A) with the flattened surfaces 512, and reduced or uneven conduction of heat from the packages 560 through the cooling apparatus' 510 walls and into the fluid medium 540 within the cooling apparatus 510. Other processes capable of producing the cooling apparatus 510 may include metal extrusion, explosive or hydraulic metal forming (in the manner of blow-mold plastic formation), which may be more expensive. Therefore, a reliable process and apparatus for making the cooling apparatus 510 with uniformly flat surfaces 512 has been developed.

Figure 6A:
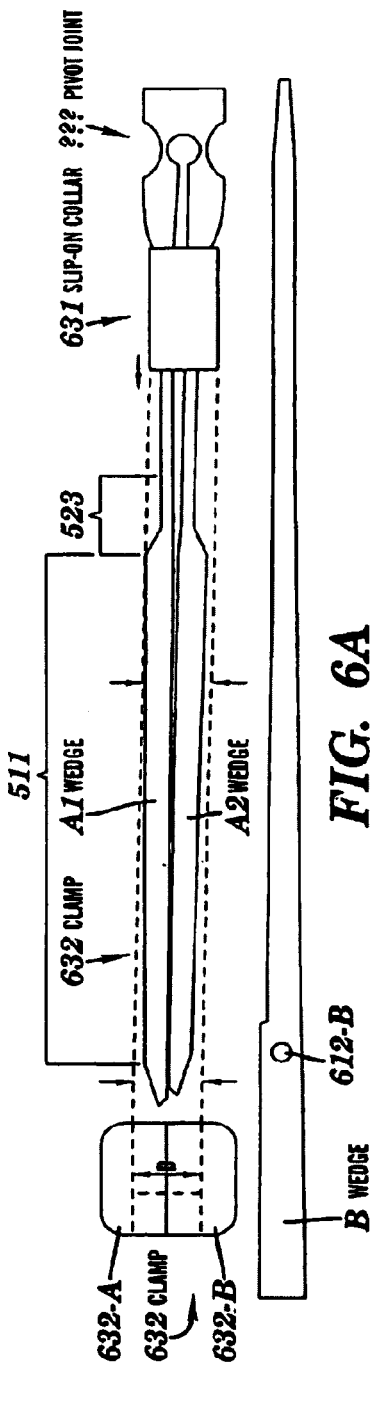
FIGS. 6A–6C depict an inventive composite anvil and the steps of a method for forming the inventive heat-sink of FIGS. 5A–5C.
Figure 6B:
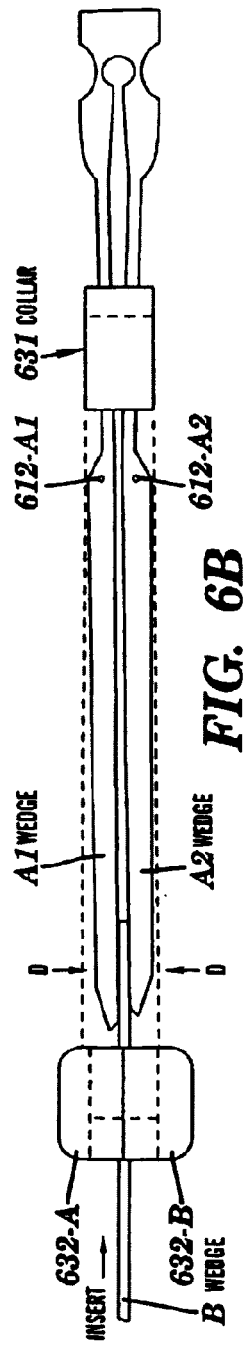
Figure 6C:
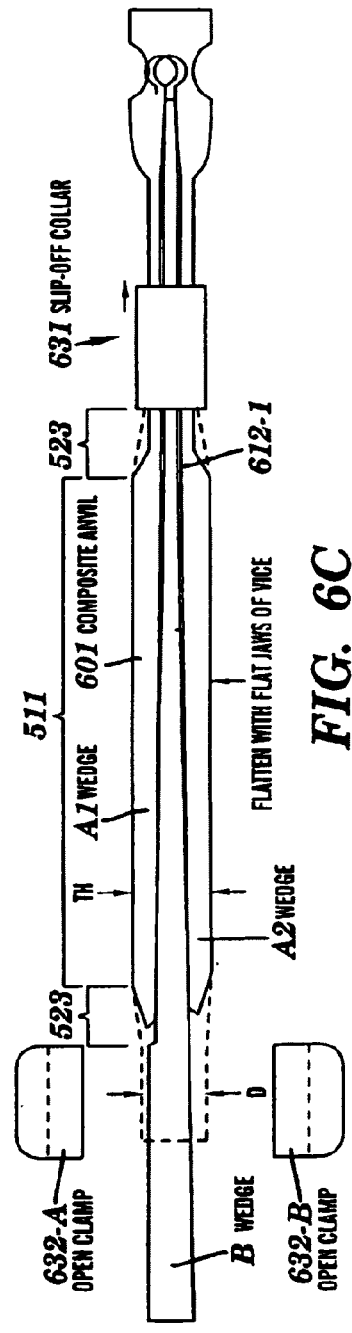

Referring to FIGS. 6A, 6B and 6C, the inventive process for making the cooling apparatus 510 may comprise placing an ordinary round copper pipe 610 between the smooth flat jaws of a vice (Not shown) as aforesaid, and in addition thereto providing a specially designed composite anvil 601 having two composite flat sides 612 (e.g., a first composite flat side 612-1 is shown in FIG. 6C) inside the pipe and expanding its height to at least the height (H) of the flattened surfaces 512.

FIGS. 6A, 6B and 6C depict an inventive composite anvil 601 (shown assembled in FIG. 6C) comprised of three narrow wedges (Wedge A1, Wedge A2, and Wedge B) and the use thereof in the steps of a method for forming the inventive heat-sink 510 of FIGS. 5A–5C. FIG. 6A depicts a first step for forming the heat sink 510 from a round copper pipe 610, that of inserting Wedge A1 and Wedge A2 inside of the round pipe 610 to be formed into the heat-sink 510. Prior to the performance of this step, a two-piece clamp (e.g., composed of half-clamp A and half-clamp-B) having a cylindrical interior may be pressingly held over an inlet/outlet portion 520 to grip and hold or manipulate the pipe 610 and/or to preserve the cylindrical shape of the pipe 610 within that inlet/outlet portion 520. The same type of two-piece Clamp may be secured over the other inlet/outlet portion 520 of the pipe. Alternatively, a simple one-piece collar (e.g., a section of larger-diameter steel pipe) having an inside diameter equal to or slightly greater than D may be slipped over one or both inlet/outlet portions 520 of the pipe 610 to grip and hold or to manipulate the pipe 610 and/or to preserve the cylindrical shape of the pipe 610 within that inlet/outlet portion 520.

Clamp

Wedge A1 and Wedge A2 may be identical in the sense that they may be mirror images of each other. Wedges A1 and Wedges A2 will have incline angles having magnitudes $IA_1$ and $IA_2$ respectively. Wedge B will have an incline angle equal to the sum of $IA_1$ plus $IA_2$. Thus, when Wedge B is mated from the opposite direction with and between Wedge A1 and Wedge A2, as shown in FIG. 6C, composite anvil 601 having parallel top and bottom edges (adapted to internally help push the narrow aspect of the pipe 610 apart to the heatsink's final height TH), and also having composite flat sides 612 (e.g., 612-2) for forming the flat surfaces 512 of the heatsink with compression.

Each of Wedge A1 and Wedge A2 will have two parallel flat sides (612-A1 and 612-A2 respectively) which, when combined with Wedge B inside of the pipe will provide two parallel composite flat surfaces 612 (e.g. 612-1 shown in FIG. 6C) opposite to each other, which will serve as an anvil surface for flattening the opposite walls of the pipe 610 to form the very flat surfaces 512 (512-1 and 512-2) of the heat sink 510.

Wedge A1 and Wedge A2 may be (optionally) joined together as shown in FIG. 6A, 6B and 6C, to simplify handing and use of them as an operative unit. Wedge A1 and Wedge A2 may be most simply joined at a flexing and/or pivoting joint 620 that is sufficiently remote from the contact portion 511 after insertion that it will allow vertical movement and/or rotation of each of Wedge A1 and A2. Alternatively, Wedge A1 and Wedge A2 and/or Wedge B may be joined and incorporated into a mechanical or robotic apparatus that can manipulate them appropriately.

While FIG. 6A depicts the first step (that of inserting Wedge A1 and Wedge A2 inside the round pipe 610), FIG. 6B depicts a second step for forming the heat sink 510, that of inserting wedge B inside of the round pipe 610 and between Wedge A1 and Wedge A2 so as to force wedge A1 and wedge A2 vertically apart.

FIG. 6C depicts the third step for forming the heat sink, that of inserting wedge B entirely through (the contact section 511 of) the pipe 610 and so as to form a composite anvil 601, while compressing the (contact section 511) of the pipe 610 between the flat jaws of a vice (not shown).

Alternative Conductor Arrangements

FIGS. 7A1 and 7B1 depict side and front cross-sections of an alternative embodiment of the inverter of FIGS. 2A–2D within the detail area delineated in FIG. 2D. In the alternative embodiment of FIGS. 7A1 and 7B1, the length of each primary winding conductors 201-1 (i.e., C4 and C6) and 201-2 (i.e., C3 and C5) have been shortened (by reducing $L_{SPAN}$ by bringing the circuit board 245 closer to the transformer 216. Also, adjacent isoelectric conductors C2 and C3 have been merged.

FIGS. 7A2 and 7B2 depict side and front cross-sections of an alternative embodiment of the inverter of FIGS. 7A1 and 7B1 wherein the isoelectic (center-tapped) primary conductors C6 and C3 plus C2 have been brought into direct contact or merged together (e.g., by reversing the designation and/or polarity of conductors C6 vs. C5, and C4 vs. C3).

FIGS. 7A3 and 7B3 depict side and front cross-sections of an alternative embodiment of the invention wherein the inverter is a full-bridge (i.e., "H"-bridge) PWM inverter comprising a single primary winding (C3-C5) and four (two pairs of) PWM-controlled switches (SWA, SWB, SWC, and SWD). (The well-known circuit topology of the H-Bridge inverter of FIGS. 7A3 and 7B3 is depicted in the circuit diagram of FIG. 7C3.) For a first interval of time T/2 (where T equals 1/f, where f equals the frequency of the AC output voltage, e.g., 60 Hz) a series of high-frequency PWM control pulses is applied to switch pair (A/B) which will cause them to close and open with a varying (i.e., sinusoidally-modulated) duty cycle that alternately forces and inhibits current though the primary winding (i.e., flowing from C3 through the transformer to C5). The number of pulses in the first interval T/2 is typically 100–300. During first interval T/2 the On versus Off time (i.e., duty cycle) in each cycle of the high frequency control signal is gradually shortened and lengthened to produce a half sinusoid variation of current magnitude through the primary winding and through the secondary winding. The same process is repeated during the next (second) interval T/2 by switch pair (C/D), alternately forcing and inhibiting current to flow from right to left through the primary winding (i.e., flowing from C5 through the transformer to C3) and through the secondary winding. The current through the primary winding may continue in the same direction during each half-cycle of T/2 duration, varying in magnitude gradually (i.e., sinusoidally) in many discrete steps at the fundamental (i.e., control)

PWM frequency. In this manner, a complete cycle of filterably pure sine-wave alternating sinusoidal current is produced in the secondary winding of the transformer.

It will be apparent from the foregoing to persons skilled in the art that, in alternative embodiments, a four-switch H-Bridge (i.e., full-bridge) inverter may be formed by providing two circuit boards 245 (each comprising left and right halves 245-R and 245-L), each board 245 holding a pair of separate composite switches (e.g., switch A and switch C on a first board 245; switch B and switch D on a second board 245 which may be the mirror image of the first board 245), each pair of switches arranged symmetrically as in FIG. 7B1. The two boards 245 may be arranged end to end, or back-to-back and merged (e.g. switch A may be disposed upside down under switch C, and switch D may be disposed upside down under switch B) and in other configurations. The conductors C1, C2, C3, C4, C5 and C6 may be rearranged, extended and/or folded for interconnection to provide the full-bridge circuit topology.

Minimum Current Path Configuration

FIG. 7A4 depicts a side cross-sections of an alternative embodiment of the half-bridge inverter of FIGS. 7A1 and 7B1 (and alternative embodiments of a full-wave inverter as in FIG. 7A3 and 7B3) wherein the circuit board 245 has been turned 90 degrees and thereby brought closer to the transformer windings, and isoelectic (center-tapped) primary conductors C6 and C3 plus C2 have been brought into direct contact or merged together (e.g., by reversing the designation and/or polarity of conductors C6 vs. C5, and C4 vs. C3).

Integrated Transformer and Output Filter Inductor

The inventive high power-density inverter may optionally include an inventive integrated transformer core and filter core configuration wherein a filter-inductor core is integrated within the windings (e.g., coils) of the transformer, (e.g., typically within the secondary coil of a power transformer as in the case of an "output filter," but alternatively, within the primary coil of the transformer).

Figure 8:
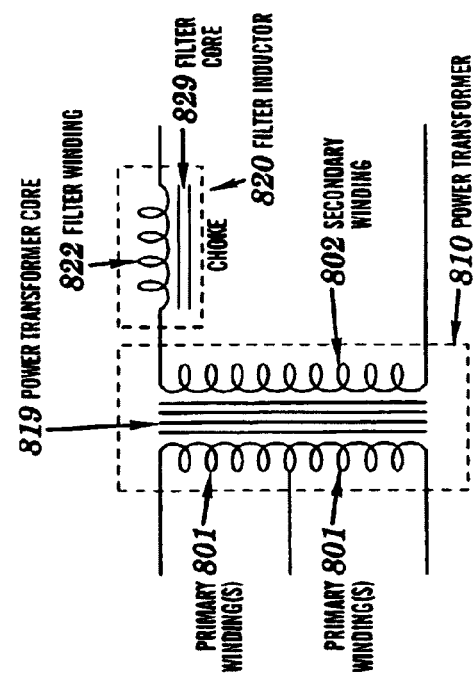
FIG. 8 depicts a circuit diagram illustrating the conventional physical separation of an inverter's power transformer core and its output filter core, and the windings of each as depicted in FIGS. 2B–2C.

FIG. 8 depicts a circuit diagram illustrating the conventional physical separation of the power transformer core 819 and an output filter core 829 in switching inverter designs of the related art. The switching inverter designs of the related art provide a filter inductor core 829 that is physically separated from core 819 and secondary windings 802 of the power transformer 810. This conventional design requires separate mounting procedures and mounting hardware (e.g., screws, nuts, bolts, brackets etc) for mounting the filter inductor 820 within the chassis of an inverter, which consumes space and time in the assembly of the inverter. The related art also generally requires separate assembly and separate wire winding procedures for the power transformer windings (e.g, 801 and 802) and windings 822 of the output filter inductor 820. A practical necessity of separate assembly and wire windings generally prevents the use of a single intact electrically conducting wire being wound around both the power transformer core 819 and the filter inductor core 829. This necessitates the use of cumbersome and fault-prone wire-end joining hardware, or soldering and insulating. The inventive integrated transformer and output filter inductor core obviates these cumbersome requirements of the related art.

Figure 9:
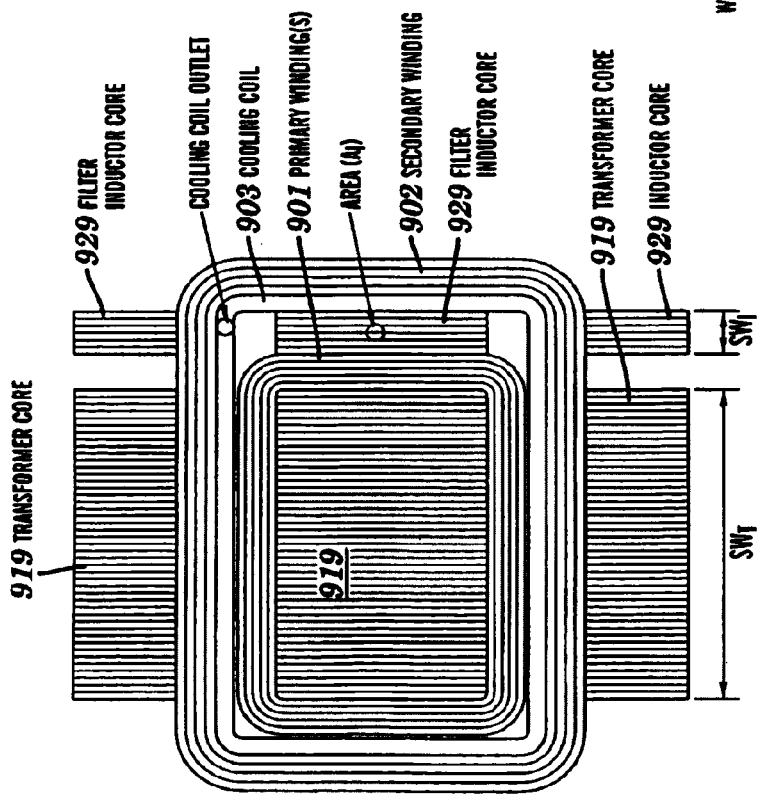
FIG. 9 depicts a horizontal cross-sectional view from a top perspective of a first embodiment of an inventive integrated-transformer-and-output-filter-inductor (ITOFI)

FIG. 9 depicts a cross-sectional view from a top perspective of an embodiment of the inventive integrated transformer and output filter inductor (ITOFI). The ITOFI comprises a transformer core 919 of the related art. The transformer core 919 may be comprised of a plurality of interleaved conventional "E" and "I" core laminations, that have been wound with the primary winding(s) 901. A filter inductor core 929 is placed abutting the primary winding 901, and the secondary winding (902) is wound around both the transformer winding 919 and the filter inductor core 929. The filter inductor core 929 may comprise a second plurality of (non-interleaved) conventional "E" core laminations plus a separate (non-interleaved) stack of conventional "I" core laminations with a gap disposed between the "E" and the "I" lamination stacks. This gap is generally needed to prevent the saturation of the inductor core 929 during operation. The stack of "I" laminations may be mounted above the stack of the "E" laminations by placing a non-metallic material spacer of the required thickness between the "E" and the "I" stacks. Each stack of core laminations in the transformer coil 919 and in the filter inductor coil 929 may be bonded together, (e.g., by epoxy) to prevent chattering and noise. Similarly, once formed, and positioned within the secondary coil, each core (919 and 929) should be firmly supported and joined firmly together so that they operate as one block with minimized noise and vibration.

The inventive ITOFI may be easily adapted to accommodate additional windings, such as a fluid-conducting cooling coil winding 903 as shown. The ITOFI of FIG. 9 may reduce the total amount of conductive material (e.g., copper in secondary winding 902) necessary to implement a power transformer plus filter inductor, as compared to the total mass of the separate transformer windings 801 and filter conductor windings 829 and intermediate wiring as shown in FIG. 8.

The inventive ITOFI may be constructed and installed without separate construction and handling of a separate filter inductor. The inventive ITOFI may be manufactured as follows: first, providing a transformer core 919 and winding the primary coil (901) for placement around the transformer coil 919 in any convenient manner that such would be performed in the related art. The transformer core is designed first to obtain desired inverter characteristics. The steel core lamination material, shape, and size are determined by the requirements of the power transformer. The filter core may use the same lamination shape as used for the transformer. A filter inductor core 929 is formed (e.g., out of a stack of "E" laminations) and the secondary (output) coil is wound around the transformer core 919 and the filter inductor core 929. The predetermined amount of output filter inductance desired for achieving the desired level of output filtering can be obtained by modifying the cross-sectional area $A_I$ of the filter inductor core 929. The stack height (e.g., the number of stacked core laminates) of the filter inductor core 929 is calculated to yield the inductor core area $A_I$ required for desired level of filtering.

As an example for one particular inverter, the stack width ($SW_T$) for the power transformer core 919 is required to be 4.5 inches, thereby requiring a stack of a certain number of each of "E" and "I" core laminations to form a three-leg core 919. And, the stack width requirement ($SW_I$) for the filter inductor to yield the inductance required for the desired level of attenuation of the harmonics, using the same "E" and "I" laminations and the same (secondary) winding as the power transformer, is 0.5 inches.

The main difference between the power transformer's magnetics and that of the filter inductor is that, the transformer core magnetic path has zero (intended) gap in the path of the flux, while the filter inductor has a large gap to prevent saturation of the inductor core. Thus, in some embodiments, the filter inductor core 929 may be left partly or completely open at the top (e.g., to have the open shape of an "E" rather than the closed "8" shape of the transformer core 919 at some or all lamination layers). In some embodiments, the dual side return cores of the inductor core 929 depicted in FIG. 9 may be omitted entirely, leaving a simple laminated iron bar core (e.g., having an effective core area $A_f$) disposed within the secondary winding of the power transformer to serve as the filter inductor core.

The filter inductor core 929 may be internally wider (measured perpendicular to $SW_f$ within the plane of the cross-section of FIG. 9) than the transformer core 919 to account for the total thickness of the coils of the primary windings 901 (i.e., to fill the dual air gaps shown within the secondary windings), provided that the effective inductor core area $A_f$ does not substantially deviate from the calculated area required for filtering. This modification will effectively increase the air gap of the filter inductor (since the return paths through the side areas will become smaller relative to the center area $A_f$). This modification of inductor core internal width from the internal width of the transformer core laminates will also have the benefit of somewhat reducing the length of conductive material (e.g., copper) used in the secondary winding. However, the inventive ITOFI constructed of only one shape (e.g., width) of core laminate provides the additional benefit that larger volume-purchases by manufactures of a single core laminate shape may reduce costs of production, and provides the many benefits of having fewer different parts in an inverter's design. The inventive ITOFI further provides the advantageous feature that inductor core size may be increased or decreased simply by changing the number of core laminates used to construct the filter inductor core, thus obviating the conventional need for keeping on hand a plurality of sizes of discrete filter inductor chokes during prototyping and manufacture of inverters of various power ratings. The inventive ITOFI may be readily incorporated into the inverter design 200 in FIGS. 2A, 2B, 2C, 2D, by substituting the inventive ITOFI in the place of transformer 216.

Figure 10:
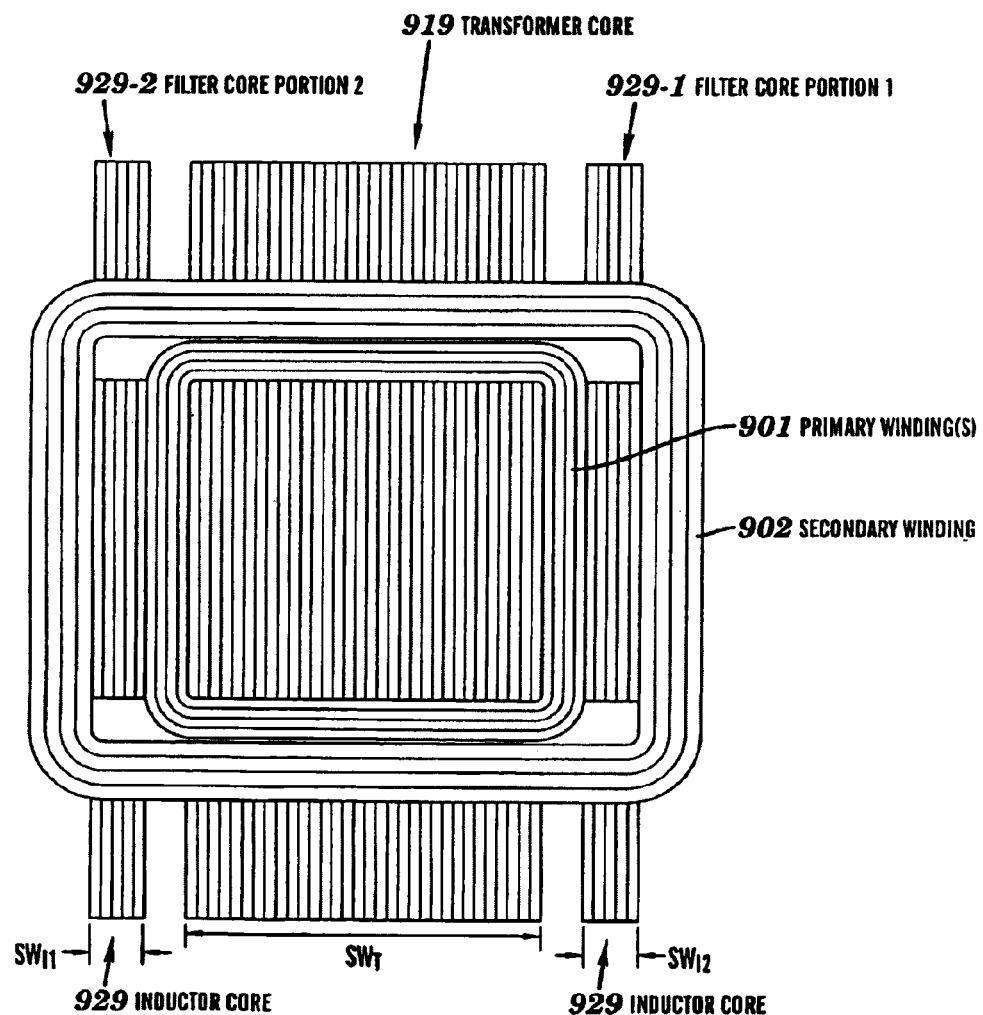
FIG. 10 depicts a horizontal cross-sectional view from a top perspective of a second embodiment of an inventive ITOFI wherein the integrated output filter core is subdivided into two physically separated portions within the secondary coil of the power transformer.

FIG. 10 depicts an alternative embodiment of the inventive integrated transformer and output filter inductor (ITOFI) of FIG. 9, wherein the integrated filter inductor core 929 is spit into two parts (929-A and 929-B), such that the sum of the stack widths (i.e., $SW_{f1}+SW_{f2}$) of each is approximately the same as the stack thickness $SW_f$ would be in the case of a single filter inductor core (as depicted in FIG. 9). The filter inductor core 929 of FIG. 9 has been split into a first inductor core portion (929-1) and a second inductor core portion (929-2), each comprising a plurality of core laminates, but not necessarily an equal number of core laminates, in each portion. The alternative embodiment depicted in FIG. 10 may be operationally equivalent to the integrated transformer and output filter inductor (ITOFI) depicted in FIG. 9, assuming an equal number of turns in each coil (901 and 902) and assuming respective transformer cores and filter inductor cores have equal cross-sectional area etc (e.g., the same total number of core laminates in FIG. 10 as in FIG. 9).

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

We claim:

1. A switching inverter, comprising:
    a first primary winding connected in series to a first switch and a DC voltage source;
    a second primary winding connected in series to a second switch and the DC voltage source;
    wherein the first primary winding and the second primary winding include ribbon-like conductors each having a thickness RIBBONTHICKNESS;
    wherein a first coil segment of the first primary winding and a second coil segment of the second primary winding are wound coaxially around a transformer core;
    wherein the first primary winding and the second primary winding are approximately parallel separated by a dielectric layer, and the distance between the cross-sectional centroid of
    the first primary winding and the cross-sectional centroid of the second primary winding is not greater than 2×RIBBONTHICKNESS, and wherein each of the ribbon-like conductors has an aspect ratio of at least 100.

2. The inverter of claim 1, wherein RIBBONTHICKNESS is not greater than one half of one millimeter.

3. The inverter of claim 2, wherein each of the ribbon-like conductors has an aspect ratio of at least 200.

4. The inverter of claim 3, wherein RIBBONTHICKNESS is less than 0.5 mm.

5. The inverter of claim 1, wherein each of the ribbon-like conductors has an aspect ratio of at least 300.

6. The inverter of claim 1, wherein the first switch is a first composite switch and the second switch is a second composite switch, wherein each of the first and second composite switches comprises a plurality of packaged semiconductor switches that are mounted on a printed circuit board and electrically connected to patterned foil conductors in a patterned foil layer of the printed circuit board, wherein the patterned foil layer is at least 1 mm thick.

7. The inverter of claim 6, wherein the composite switches are able to continuously switch more than 300 amps of current at a switching frequency of at least 10 kHz.

8. The inverter of claim 1, wherein the inverter is adapted to output more than 3,000 watts of filterably pure-sine-wave AC power.

9. The inverter of claim 1, wherein the inverter is adapted to output more than 5,000 watts of filterably pure-sine-wave AC power.

10. The inverter of claim 1, wherein the inverter is adapted to output 10,000 watts or more of filterably pure-sine-wave AC power.

11. The inverter of claim 10, wherein the inverter is enclosable within an enclosure having a volume of 2240 cubic inches.

12. The inverter of claim 10, wherein the inverter has a DC-to-AC power conversion efficiency is equal to or greater than 80 percent.

13. The inverter of claim 1, wherein the inverter can operate continuously at an AC power density not less than 3.0 Watts per cubic inch.

14. The inverter of claim 1, wherein the first switch and the second switch are controlled by sinewave-modulated pulse-width-modulated (PWM) switch-control signals.

15. The inverter of claim 14, wherein the switching inverter is adapted to operate continuously at a switching frequency higher than the human audible frequency range.

16. The inverter of claim 15, wherein the inverter is adapted to continuously output at least 5,000 watts of filterably pure-sine-wave AC power.

17. The inverter of claim 16, wherein the inverter has an AC power density of at least 4.0 Watts per cubic inch.

18. The inverter of claim 1, wherein the inverter can operate continuously at an AC power density not less than 4.0 Watts per cubic inch.

19. The inverter of claim 1, wherein the inverter can operate continuously at an AC power density not less than 6.0 Watts per cubic inch.

20. An inverter, comprising:

a first primary winding conductor connected in series to a first sinewave-modulated pulse-width-modulated (PWM)-controlled switch and a DC voltage source, the first switch being a first composite switch including a first plurality of semiconductor switches mounted in at least one row on a first portion of printed circuit-board;

a second primary winding conductor connected in series to a second sinewave-modulated PWM-controlled switch and the DC voltage source, the second switch being a second composite switch including a second plurality of semiconductor switches mounted in at least one row on a second portion of a printed circuit-board;

wherein the first primary winding and the second primary winding have a minimized uncoupled inductance such that more than 100 amperes of current in the primary windings can be switched perpetually at frequencies greater than 2,000 Hz by the PWM-controlled switches.

21. The inverter of claim 20, further comprising a fluid-cooled linear heat sink in thermally conductive contact with the first plurality of semiconductor switches, the heat sink having a flat side abutted to a flat side of each semiconductor switch of the first plurality of semiconductor switches.

22. The inverter of claim 20, wherein the semiconductor switches of the first plurality of semiconductor switches are mounted in two parallel rows on the first portion of printed circuit-board, and wherein the linear heat sink is in thermally conductive contact with the semiconductor switches of the first plurality of semiconductor switches in both of the two parallel rows.

* * * * *